United States Patent
Hsu et al.

(10) Patent No.: US 11,274,173 B2
(45) Date of Patent: Mar. 15, 2022

(54) SURFACTANT RESPONSIVE EMULSION POLYMERIZATION MICRO-GELS

(71) Applicant: Lubrizol Advanced Materials, Inc., Cleveland, OH (US)

(72) Inventors: Shui-Jen Raymond Hsu, Westlake, OH (US); Krishnan Chari, Hudson, OH (US); Sinan Li, Hudson, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 16/552,250

(22) Filed: Aug. 27, 2019

(65) Prior Publication Data

US 2020/0010593 A1    Jan. 9, 2020

Related U.S. Application Data

(63) Continuation of application No. 15/105,612, filed as application No. PCT/US2014/070769 on Dec. 17, 2014, now abandoned.

(60) Provisional application No. 61/917,069, filed on Dec. 17, 2013.

(51) Int. Cl.

| | |
|---|---|
| *C08F 220/20* | (2006.01) |
| *C08F 220/18* | (2006.01) |
| *C09K 8/035* | (2006.01) |
| *C09K 8/12* | (2006.01) |
| *C09K 8/60* | (2006.01) |
| *C09K 8/68* | (2006.01) |
| *C09K 8/88* | (2006.01) |
| *C08F 216/12* | (2006.01) |

(52) U.S. Cl.
CPC .......... *C08F 220/20* (2013.01); *C08F 220/18* (2013.01); *C09K 8/035* (2013.01); *C09K 8/12* (2013.01); *C09K 8/602* (2013.01); *C09K 8/604* (2013.01); *C09K 8/685* (2013.01); *C09K 8/882* (2013.01); *C09K 8/887* (2013.01); *C08F 216/125* (2013.01); *C08F 2810/20* (2013.01); *C09K 2208/06* (2013.01)

(58) Field of Classification Search
None
See application file for complete search history.

(56) References Cited

U.S. PATENT DOCUMENTS

| | | | |
|---|---|---|---|
| 2001/0049417 A1* | 12/2001 | Frate | .................... A61K 9/7023 525/221 |
| 2011/0308799 A1* | 12/2011 | Tarafdar | ................. C04B 28/02 166/293 |
| 2013/0047892 A1 | 2/2013 | Palmer, Jr. | |
| 2014/0114006 A1* | 4/2014 | Palmer, Jr. | ........... C09D 171/02 524/458 |
| 2014/0272156 A1 | 9/2014 | Palmer, Jr | |

FOREIGN PATENT DOCUMENTS

| | | |
|---|---|---|
| WO | 02/100525 A2 | 12/2002 |
| WO | 03/010124 A1 | 2/2003 |
| WO | 2013040174 A1 | 3/2013 |

\* cited by examiner

*Primary Examiner* — Jeffrey D Washville
(74) *Attorney, Agent, or Firm* — Thoburn Dunlap

(57) ABSTRACT

A stable, aqueous composition containing a crosslinked, nonionic, amphiphilic polymer capable of forming a yield stress fluid in the presence of a surfactant is disclosed. The yield stress fluid is capable of suspending insoluble materials in the form of particulates and/or droplets requiring suspension or stabilization.

39 Claims, No Drawings

SURFACTANT RESPONSIVE EMULSION POLYMERIZATION MICRO-GELS

CROSS REFERENCE TO RELATED APPLICATION

This application is a continuation application of U.S. application Ser. No. 15/105,612 filed on Jun. 17, 2016 which claims priority from International Application No. US2014/070769 filed on Dec. 17, 2014 which claims the benefit of Provisional Application Ser. No. 61/917,069 filed on Dec. 17, 2013.

FIELD OF THE DISCLOSED TECHNOLOGY

The disclosed technology relates to rheology modifiers and more specifically to a yield stress fluid comprising a surfactant responsive micro-gel. Additionally, the disclosed technology also relates to the formation of a rheologically and phase stable surfactant responsive micro-gel composition that can be used over a broad pH range to suspend particulates and insoluble materials.

BACKGROUND OF THE DISCLOSED TECHNOLOGY

We are surrounded in everyday life by yield stress fluids. Simply stated, yield stress fluids remain stationary until a sufficient stress is placed on the fluid at which point the fluid will flow. It can be thought of as the initial resistance to flow under stress and is also referred to as yield value. Yield stress is a measurable quantity similar to, but not dependent on viscosity. While a certain rheology modifier may thicken or enhance the viscosity of a composition in which it is included, it does not necessarily have desirable yield stress properties.

A desirable yield stress property is critical to achieving certain physical and aesthetic characteristics in a liquid medium, such as the indefinite suspension of particles, insoluble liquid droplets, or the stabilization of gas bubbles within a liquid medium. Particles dispersed in a liquid medium will remain suspended if the yield stress (yield value) of the medium is sufficient to overcome the effect of gravity or buoyancy on those particles. Insoluble liquid droplets can be prevented from rising and coalescing and gas bubbles can be suspended and uniformly distributed in a liquid medium using yield value as a formulating tool. An example of a yield stress fluid is a micro-gel rheology modifier which is used generally to adjust or modify the rheological properties of aqueous compositions. Such properties include, without limitation, viscosity, flow rate, stability to viscosity change over time, and the ability to suspend particles for indefinite periods of time. They are useful in a number of consumer and industrial applications. An important consumer application includes their use in the formulation of personal care products such as body washes, skin creams, toothpastes, shampoos, hair gels and other cosmetics. In industrial applications, they are useful as subterranean treatment fluids in the oil and gas industry as a component in drilling and fracturing fluids. Typically, they comprise chemically crosslinked polymers having a pH-responsive functionality that is either base or acid sensitive. The polymers may be mixed with other ingredients in a formulation and then neutralized by the addition of a neutralization agent such as an acid or a base. Acid sensitive thickeners are activated upon contact with an acidic agent, while base-sensitive thickeners are activated upon contact with an alkaline agent. Upon neutralization, the polymers swell significantly to form a randomly close-packed (RCP) jammed network of swollen cross-linked micro-gel particles imparting a desired rheological profile, i.e., yield stress, elastic modulus, and viscosity, as well as optical clarity to the formulation.

These types of rheology modifiers are well known in the art. For example, U.S. Pat. Nos. 2,798,053; 2,858,281; 3,032,538; and 4,758,641 describe cross-linked carboxylic acid polymers based on acrylic acid, maleic acid, itaconic acid or methacrylic acid monomers. U.S. Pat. No. 6,635,702 describes crosslinked alkali-swellable acrylate copolymers comprising one or more carboxylic acid monomers and one or more non-acid vinyl monomers. U.S. Pat. No. 7,378,479 discloses a crosslinked acid-swellable polymer containing at least one basic amino substituent that is cationic at low pH, at least one hydrophobically modified polyoxyalkylene substituent derived from an associative vinyl monomer, and at least one polyoxyalkylene substituent derived from a semi-hydrophobic vinyl surfactant monomer. A key feature of these pH-responsive micro-gels is the very large increase in diameter (or size) of individual cross-linked polymer particles upon neutralization. The high swelling efficiency allows formulators to achieve the desired yield stress and viscosity using relatively small amounts of polymer resulting in low cost-in-use. Dalmont, Pinprayoon and Saunders (*Langmuir* vol. 24, page 2834, 2008) show that individual particles in a micro-gel dispersion of a copolymer of ethyl acrylate, and methacrylic acid cross-linked with butanediol diacrylate increase in diameter by at least a factor of 3 upon pH-activation or neutralization. The level of swelling causes an increase in volume fraction of at least 27 ($3^3$). A jammed network is achieved upon neutralization (or activation) with a relatively low concentration of polymer (less than 3 wt. %).

Although pH-responsive micro-gels provide yield stress fluids with the high efficiency that is desired by the formulator, they suffer from a major disadvantage. Rheological properties are not uniform across a broad range in pH and show sharp changes as a function of pH. To overcome these difficulties, various non-ionic thickeners have been proposed. U.S. Pat. No. 4,722,962 describes non-ionic associative thickeners comprising a water-soluble monoethylenically unsaturated monomer and a non-ionic urethane monomer. These polymers provide increases in viscosity or thickening of aqueous formulations that is relatively independent of pH but the polymers are not cross-linked and the purely associative interactions do not create a yield stress.

In addition to pH-responsive micro-gels, temperature-responsive micro-gels are known in the art. Senff and Richtering (*Journal of Chemical Physics*, vol. 111, page 1705, 1999) describe the change in size of non-ionic chemically cross-linked poly (N-isopropylacrylamide) (PNIPAM) micro-gel particles as a function of temperature. The particles swell by almost a factor of 2.5 in diameter (15 times in terms of volume fraction) when the temperature is reduced from 35° C. to 10° C. Although this represents a significant degree of swelling, the use of temperature to activate micro-gels is undesirable. A method of activation is needed that enables switching from a free-flowing suspension to a jammed yield stress fluid under ambient conditions.

Wu and Zhou (*Journal of Polymer Science: Part B: Polymer Physics*, vol. 34, page 1597, 1996) describe the effect of surfactant on swelling of chemically cross-linked PNIPAM homo-polymer micro-gel particles in water. The use of surfactants to activate micro-gels is attractive because many formulations contain surfactants as co-ingredients.

However, the efficiency of swelling reported by Wu and Zhou is extremely low. The anionic surfactant sodium dodecyl (lauryl) sulfate increases the size of cross-linked PNIPAM particles by only a factor of 1.4 at room temperature. Furthermore, Wu and Zhou do not teach how to create a shear thinning yield stress fluid with high optical clarity.

Hidi, Napper and Sangster (*Macromolecules*, vol. 28, page 6042, 1995) describe the effect of surfactant on swelling of poly (vinyl acetate) homopolymer micro-gels in water. For micro-gels that are not cross-linked they report an increase in diameter by a factor of 3 to 4 corresponding to a 30 to 60 fold change in volume of the original particles in the presence of sodium dodecyl (lauryl) sulfate. However, swelling is drastically reduced for cross-linked particles. In this case, they observe an increase in diameter by only a factor of 1.4. Once again, Hidi, Napper and Sangster do not teach how to create a shear thinning yield stress fluid with high optical clarity.

Apart from providing the necessary rheology profiles, the suspension of solids and/or insoluble materials in a phase stable system is equally important to a rheology modifier. In drilling for oil and gas, subterranean treatment fluids (e.g., drilling and fracture fluids) are typically modified with gelling agents to provide desired rheological properties. Gelling agents include any substance that is capable of increasing the viscosity of a fluid, for example, by forming a micro-gel. These agents must not only possess desirable rheological properties in terms of fluid flow and pumpability, but must also have the capability to suspend solids under both dynamic and static conditions. During active drilling operations, the drilling fluid must possess sufficient structure to carry the formation cuttings to the surface and also have the necessary shear thinning properties to be pumpable. During non-drilling periods, the drilling fluid may remain stationary in the bore hole for hours or even days at a time. During this period, settling of entrained solids can be problematic if the fluid does not have enough structure to support both large and small particulate matter.

Fracturing is used to boost the production of hydrocarbons such as petroleum or natural gas from subterranean formations. In this process, a fracturing fluid containing a gelling agent is injected through a wellbore and forced against the formation strata by high pressure sufficient to cause the strata to crack and fracture thereby liberating the hydrocarbon trapped in the formation. The fracturing fluid also carries a proppant to the fracture site. Proppant particles remain in the fracture thereby "propping" the fracture open when the well is in production. The proppant material is typically selected from sand, sintered bauxite, glass balls, polystyrene beads and the like. Whereas sufficient rheological properties are important in treatment fluids used in fracturing, satisfactory suspending ability is necessary for the transport of the proppant materials to the fracture site within the formation.

Conditions are harsh within a subterranean formation and a gelling agent must be stable to variations in temperature, brackish environments, wide ranges of pH, and changes in shear forces.

Various problems have been encountered with subterranean treatment fluids in oil field applications, including the lack of thermal stability of the gel upon exposure to varying temperatures and pH, as well as high shear conditions. This can result in changes in the rheological properties of the gel which can ultimately affect the ability of the fluid to suspend bore hole cuttings and or proppant materials. If particulate materials are prematurely lost from the treatment fluid, it can have a detrimental effect on the drilling and development of the formation. Furthermore, gel instability can result in higher loss of fluid into the formation thereby diminishing the efficiency of the operation.

Personal care compositions which can suspend particles and/or other water insoluble materials are very desirable. These materials impart or contribute to a variety of user benefits including but not limited to exfoliation, visual aesthetics, and/or the encapsulation and release of beneficial agents upon use. The suspension of particulate and insoluble materials as active and aesthetic agents in personal care compositions is becoming increasingly popular with formulators. Typically, particles are suspended in personal care compositions using structuring systems such as acrylate polymers, structuring gums (e.g., xanthan gum), starch, agar, hydroxyl alkyl cellulose, etc. However, the addition of beads or particles to personal care compositions tends to be problematic. For example, one problem is that particles or insoluble materials very frequently tend to be of a different density than the continuous phase of the composition to which they are added. This mismatch in the density can lead to separation of the particles from the continuous phase and a lack of overall product stability. In one aspect, when added particles are less dense than that of the composition continuous phase, the particles tend to rise to the top of such phase ("creaming"). In another aspect, when the added particles have a density greater than that of the continuous phase, the particles tend to gravitate to the bottom of such phase ("settling"). When large particles are desired to be suspended (e.g., polyethylene particles, guar beads, etc.), the level of polymer used is typically increased to provide increased structure for suspended beads. A consequence of thickening a liquid to provide structure for suspended beads causes a significant increase in liquid viscosity and a corresponding decrease in pourability, a property which is not always desirable. Highly viscous products are typically difficult to apply and rinse away, especially if the shear thinning profile of the viscosity building agent is deficient. High viscosities can also adversely affect packaging, dispensing, dissolution, and the foaming and sensory properties of the product. Moreover, conventionally structured liquids are often opaque or turbid thereby obscuring the suspended beads from the consumer, which adversely affects the aesthetic appeal of the product.

Many common thickeners such as xanthan gum, carboxymethylcellulose (CMC), carrageenan, and acrylic acid homopolymers and copolymers are anionic and therefore, can react with the cationic surfactants and cause precipitation of the cationic and thickener or reduce the efficacy of the cationic surfactant. Non-ionic thickeners such as hydroxyethylcellulose (HEC) and hydroxypropylmethylcellulose (HPMC) can provide viscosity in cationic systems, however, very little suspension properties are imparted to the fluid. Cationic thickeners such as Polyquaternium-10 (cationically modified HEC) and cationic guar provide thickening in cationic systems but not suspension. Some acrylic polymers are effective at thickening cationic systems but they can be limited by pH, require high concentrations, have high cost-in-use, and often have narrow limits of compatibility with the cationic materials.

Anionic surfactants are often used as detersive agents in cleansers and cleaning products because of their excellent cleaning and foaming properties. Exemplary anionic surfactants traditionally utilized in these formulations include, for example, alkyl sulfates and alkyl benzene sulfonates. While the anionic surfactants and, in particular, the anionic sulfates and sulfonates are efficient detersive agents, they are severe ocular irritants and capable of causing mild to moderate dermal irritation to some sensitized persons. Accordingly, it has become increasingly important to consumers that aqueous cleansing compositions be mild in that they do not irritate the eyes and skin when in use. Manufacturers are striving to provide mild cleansing products that also incorporate insoluble benefit and/or aesthetic agents that require stable suspension. It is known that the irritation caused by anionic sulfates and sulfonates can be reduced by utilizing the ethoxylated forms thereof. While ethoxylated surfactants may mitigate ocular and skin irritation in compositions in which they are included, a major problem in using these surfactants is that it is difficult to obtain desirable yield stress properties in an ethoxylated system.

U.S. Pat. No. 5,139,770 describes the use of crosslinked homopolymers of vinyl pyrrolidone in surfactant containing formulations such as conditioning shampoo to obtain relatively high viscosities. However, the patent does not teach how to create a yield stress fluid with high optical clarity that is also shear thinning.

U.S. Pat. No. 5,663,258 describes the preparation of crosslinked copolymers of vinyl pyrrolidone/vinyl acetate. High viscosities are obtained when the polymer is combined with water but there is no teaching about using the polymer to create a yield stress fluid that is activated by surfactant.

U.S. Pat. No. 6,645,476 discloses a water soluble polymer prepared from the free radical polymerization of a hydrophobically modified ethoxylated macromer in combination with a copolymerizable second monomer selected from unsaturated acids and their salts and/or a myriad of other monomers including N-vinyl lactams and vinyl acetate. Preferred polymers are crosslinked and are polymerized from hydrophobically modified ethoxylated macromers in combination with neutralized acrylamidolmethylpropanesulfonic acid. The viscosities of 1% aqueous solutions of the polymer preferably range from 20,000 mPa·s to 100,000 mPa·s. There is no teaching of a surfactant activated polymer devoid of hydrophobically modified ethoxylated macromer repeating units providing a yield stress fluid exhibiting good suspension properties without a substantial increase in viscosity.

There remains a challenge to not only demonstrate the ability to effectively suspend particles within stable microgel containing compositions, but also exhibit desirable mildness, desirable rheology profiles, clarity and aesthetic characteristics across a wide range of temperature and pH conditions at low polymer usage levels. Accordingly, there is a need for a yield stress fluid based on polymer micro-gel particles wherein the concentration of polymer is no more than 5 wt. % based on the weight of the composition in which it is included and having a yield stress value of at least 1 mPa, or 0.1 Pa, wherein the yield stress, elastic modulus and optical clarity are substantially independent of pH. There is also a need to provide yield stress fluids formulated with mild surfactants such as, for example, surfactants containing ethylene oxide moieties.

SUMMARY OF THE DISCLOSED TECHNOLOGY

The present technology provides crosslinked, nonionic, amphiphilic polymers, or amphiphilic polymers for short, that can be swollen in the presence of a surfactant. The amphiphilic polymers can be prepared by polymerizing a monomer composition including at least one hydrophilic monomer, at least one hydrophobic monomer and a crosslinking monomer. The crosslinking monomer may be an amphiphilic crosslinking agent, or a mixture of an amphiphilic crosslinking agent and a conventional crosslinking agent.

In an embodiment, it has been found that amphiphilic crosslinking agents can be easily reacted into amphiphilic polymer. Amphiphilic crosslinking agents can contain more than one reactive moiety. In some embodiments the at least one reactive moiety can be an allyl group.

In another aspect, an embodiment of the disclosed technology relates to a yield stress fluid comprising a crosslinked, nonionic, amphiphilic polymer and a surfactant.

In still another aspect, an embodiment of the disclosed technology relates to a thickened aqueous composition comprising a crosslinked, nonionic, amphiphilic polymer and at least one surfactant, wherein the concentration of the polymer is no more than 5 wt. % based on the total weight of the composition, and the at least one surfactant is no more than 70 wt. % of the composition, the yield stress of the composition is at least 1 mPa, or 0.1 Pa with a shear thinning index of less than 0.5 at shear rates between about 0.1 and about 1 reciprocal seconds, and wherein the yield stress, elastic modulus and optical clarity of the composition are substantially independent of pH in the range of about 2 to about 14.

In still another aspect, an embodiment of the disclosed technology relates to a thickened aqueous composition comprising a crosslinked, nonionic, amphiphilic polymer and at least one surfactant, wherein the concentration of the polymer is no more than 5 wt. % based on the total weight of the composition, and the at least one surfactant is no more than 70 wt. % of the composition, wherein the ratio of the standard deviation to the mean of measured values for yield stress, elastic modulus and optical clarity is less than 0.3 in one aspect, and less than 0.2 in another aspect in the pH range from about 2 to about 14.

In still another aspect, an embodiment of the disclosed technology relates to a thickened aqueous composition comprising a crosslinked, nonionic, amphiphilic polymer and at least one surfactant, wherein the concentration of the polymer is no more than 5 wt. % based on the total weight of the composition, and at least one surfactant is no more than 70 wt. % of the composition, the yield stress of the composition is at least 1 mPa, or 0.1 Pa with a shear thinning index of less than 0.5 at shear rates between about 0.1 and about 1 reciprocal seconds, and wherein the yield stress, elastic modulus and optical clarity of the composition are substantially independent of pH in the range of about 2 to about 14 and wherein the composition is able to suspend beads of a size between 0.5 and 1.5 mm wherein the difference in specific gravity of the beads relative to water is in the range of 0.2 to 0.5 for a period of at least 4 weeks at room temperature.

In still another aspect, an embodiment of the disclosed technology relates to a thickened aqueous composition comprising a crosslinked, nonionic, amphiphilic polymer and one or more surfactants, wherein the concentration of the polymer is no more than 5 wt. % based on the total weight of the composition, wherein the total concentration of surfactant is no more than 70 wt. % of the composition, the yield stress of the composition is at least 1 mPa, or 0.1 Pa with a shear thinning index of less than 0.5 at shear rates between about 0.1 and about 1 reciprocal seconds, and wherein the yield stress, elastic modulus and optical clarity of the composition are substantially independent of pH in the range of about 2 to about 14 and wherein the composition is able to suspend beads of a size between 0.5 and 1.5 mm where the difference in specific gravity of the beads relative to water is in the range of 0.2 to 0.5 for a period of at least 4 weeks at room temperature and wherein one of the surfactants contains ethylene oxide moieties and said surfactant is more than 75% by weight of the total surfactant.

The crosslinked, nonionic, amphiphilic polymer compositions as well as the thickened aqueous fluid comprising the nonionic, amphiphilic, polymer compositions and the at least one surfactant of the disclosed technology may suitably comprise, consist of, or consist essentially of the components, elements, and process delineations described herein. The disclosed technology illustratively disclosed herein suitably may be practiced in the absence of any element which is not specifically disclosed herein.

Unless otherwise stated, all percentages, parts, and ratios expressed herein are based upon the total weight of the components contained in the compositions of the disclosed technology.

As used herein, the term "amphiphilic polymer" means that the polymeric material has distinct hydrophilic and hydrophobic portions. "Hydrophilic" typically means a portion that interacts intramolecularly with water and other polar molecules. "Hydrophobic" typically means a portion that interacts preferentially with oils, fats or other non-polar molecules rather than aqueous media.

As used herein, the term "hydrophilic monomer" means a monomer that is substantially water soluble. "Substantially water soluble" refers to a material that is soluble in distilled (or equivalent) water, at 25° C., at a concentration of about 3.5% by weight in one aspect, and soluble at about 10% by weight in another aspect (calculated on a water plus monomer weight basis).

As used herein, the term "hydrophobic monomer" means a monomer that is substantially water insoluble. "Substantially water insoluble" refers to a material that is not soluble in distilled (or equivalent) water, at 25° C., at a concentration of about 3% by weight in one aspect, and not soluble at about 2.5% by weight in another aspect (calculated on a water plus monomer weight basis).

The term "nonionic" as used herein encompasses both a monomer, monomer composition or a polymer polymerized from a monomer composition devoid of ionic or ionizable moieties ("nonionizable"), and a "substantially nonionic" monomer, monomer composition or polymer polymerized from a monomer composition.

An ionizable moiety is any group that can be made ionic by neutralization with an acid or a base.

An ionic or an ionized moiety is any moiety that has been neutralized by an acid or a base.

By "substantially nonionic" is meant that the monomer, monomer composition or polymer polymerized from a monomer composition contains less than 5 wt. % in one aspect, less than 3 wt. % in another aspect, less than 1 wt. % in a further aspect, less than 0.5 wt. % in a still further aspect, less than 0.1 wt. % in an additional aspect, and less than 0.05 wt. % in a further aspect, of an ionizable and/or an ionized moiety.

For the purpose of the specification the prefix "(meth)acryl" includes "acryl" as well as "methacryl". For example, the term "(meth)acrylamide" includes both acrylamide and methacrylamide.

DESCRIPTION OF EXEMPLARY EMBODIMENTS

Exemplary embodiments in accordance with the disclosed technology will be described. Various modifications, adaptations or variations of the exemplary embodiments described herein may become apparent to those skilled in the art as such are disclosed. It will be understood that all such modifications, adaptations or variations that rely upon the teachings of the disclosed technology, and through which these teachings have advanced the art, are considered to be within the scope and spirit of the disclosed technology.

While overlapping weight ranges for the various components and ingredients that can be contained in the compositions of the disclosed technology have been expressed for selected embodiments and aspects of the disclosed technology, it should be readily apparent that the specific amount of each component in the disclosed compositions will be selected from its disclosed range such that the amount of each component is adjusted such that the sum of all components in the composition will total 100 weight percent. The amounts employed will vary with the purpose and character of the desired product and can be readily determined by one skilled in the art.

It has been unexpectedly discovered that highly efficient yield stress fluids with excellent shear thinning and optical clarity over a broad pH range are obtained if certain chemically crosslinked, nonionic (or substantially nonionic), amphiphilic polymers are mixed with surfactants in water. It has been determined that crosslinking provides the right balance between mechanical rigidity of the particles and expansion in aqueous surfactant media. The crosslinked, nonionic (or substantially nonionic), amphiphilic polymers of the present technology display high surfactant activated swelling in water with increases in particle diameter of at least a factor of 2.5 in one aspect and at least 2.7 in another aspect. Furthermore, swollen micro-gels based on the polymers of the disclosed technology interact with each other in aqueous surfactant media to create soft glassy materials (SGMs) with high yield stress and shear thinning flow that is substantially independent of pH.

Amphiphilic Polymer

The crosslinked, nonionic, amphiphilic polymers useful in the practice of the disclosed technology are polymerized from monomer components that contain free radically polymerizable unsaturation. In one embodiment, the crosslinked, nonionic, amphiphilic polymers useful in the practice of the disclosed technology are polymerized from a monomer composition comprising at least one nonionic, hydrophilic unsaturated monomer, at least one unsaturated hydrophobic monomer, and at least one polyunsaturated crosslinking monomer. In one aspect, the copolymer can be polymerized from a monomer composition comprising any weight ratio of nonionic, hydrophilic unsaturated monomer to unsaturated hydrophobic monomer.

In one embodiment, the copolymers can be polymerized from a monomer composition typically having a hydrophilic monomer to hydrophobic monomer ratio of from about 5:95 wt. % to about 95:5 wt. %, from about 15:85 wt. % to about 85:15 wt. % in another aspect, and from about 30:70 wt. % to about 70:30 wt. % in a further aspect, based on the total weight of the hydrophilic and hydrophobic monomers present. The hydrophilic monomer component can be selected from a single hydrophilic monomer or a mixture of hydrophilic monomers, and the hydrophobic monomer component can be selected from a single hydrophobic monomer or a mixture of hydrophobic monomers.

Hydrophilic Monomer

The hydrophilic monomers suitable for the preparation of the crosslinked, nonionic, amphiphilic polymer compositions of the disclosed technology are selected from but are not limited to hydroxy($C_1$-$C_5$)alkyl (meth)acrylates; open chain and cyclic N-vinylamides (N-vinyllactams containing 4 to 9 atoms in the lactam ring moiety, wherein the ring carbon atoms optionally can be substituted by one or more lower alkyl groups such as methyl, ethyl or propyl); amino group containing vinyl monomers selected from (meth) acrylamide, N—($C_1$-$C_5$)alkyl(meth)acrylamides, N, N-di ($C_1$-$C_5$)alkyl(meth)acrylamides, N—($C_1$-$C_5$)alkylamino ($C_1$-$C_5$)alkyl(meth)acrylamides and N,N-di($C_1$-$C_5$) alkylamino($C_1$-$C_5$)alkyl(meth)acrylamides, wherein the alkyl moieties on the disubstituted amino groups can be the same or different, and wherein the alkyl moieties on the monosubstituted and disubstituted amino groups can be optionally substituted with a hydroxyl group; other monomers include vinyl alcohol; vinyl imidazole; and (meth) acrylonitrile. Mixtures of the foregoing monomers also can be utilized.

The hydroxy($C_1$-$C_5$)alkyl (meth)acrylates can be structurally represented by the following formula:

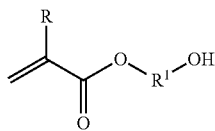
(I)

wherein R is hydrogen or methyl and $R^1$ is an divalent alkylene moiety containing 1 to 5 carbon atoms, wherein the alkylene moiety optionally can be substituted by one or more methyl groups. Representative monomers include 2-hydroxyethyl(meth)acrylate, 3-hydroxypropyl(meth)acrylate, 4-hydroxybutyl(meth)acrylate, and mixtures thereof.

Representative open chain N-vinylamides include N-vinylformamide, N-methyl-N-vinylformamide, N-(hydroxymethyl)-N-vinylformamide, N-vinylacetamide, N-vinylmethylacetamide, N-(hydroxymethyl)-N-vinylacetamide, and mixtures thereof.

Representative cyclic N-vinylamides (also known as N-vinyllactams) include N-vinyl-2-pyrrolidinone, N-(1-methyl vinyl) pyrrolidinone, N-vinyl-2-piperidone, N-vinyl-2-caprolactam, N-vinyl-5-methyl pyrrolidinone, N-vinyl-3,3-dimethyl pyrrolidinone, N-vinyl-5-ethyl pyrrolidinone and N-vinyl-6-methyl piperidone, and mixtures thereof. Additionally, monomers containing a pendant N-vinyl lactam moiety can also be employed, e.g., N-vinyl-2-ethyl-2-pyrrolidone (meth)acrylate.

The amino group containing vinyl monomers include (meth)acrylamide, diacetone acrylamide and monomers that are structurally represented by the following formulas:

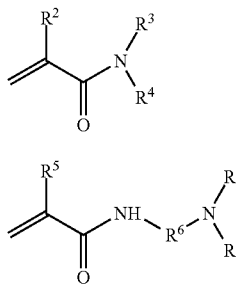
(II)

(III)

Formula (II) represents N—($C_1$-$C_5$)alkyl(meth)acrylamide or N,N-di($C_1$-$C_5$)alkyl(meth)acrylamide wherein $R^2$ is hydrogen or methyl, $R^3$ independently is selected from hydrogen, $C_1$ to $C_5$ alkyl and $C_1$ to $C_5$ hydroxyalkyl, and $R^4$ independently is selected from is $C_1$ to $C_5$ alkyl or $C_1$ to $C_5$ hydroxyalkyl.

Formula (III) represents N—($C_1$-$C_5$)alkylamino($C_1$-$C_5$) alkyl(meth)acrylamide or N,N-di($C_1$-$C_5$)alkylamino($C_1$-$C_5$) alkyl(meth)acrylamide wherein $R^5$ is hydrogen or methyl, $R^6$ is $C_1$ to $C_5$ alkylene, $R^7$ independently is selected from hydrogen or $C_1$ to $C_5$ alkyl, and $R^8$ independently is selected from $C_1$ to $C_5$ alkyl.

Representative N-alkyl(meth)acrylamides include but are not limited to N-methyl(meth)acrylamide, N-ethyl(meth) acrylamide, N-propyl(meth)acrylamide, N-isopropyl(meth) acrylamide, N-tert-butyl(meth)acrylamide, N-(2-hydroxyethyl)(meth)acrylamide, N-(3-hydroxypropyl)(meth) acrylamide, and mixtures thereof.

Representative N,N-dialkyl(meth)acrylamides include but are not limited to N, N-dimethyl(meth)acrylamide, N, N-diethyl(meth)acrylamide, N,N-(di-2-hydroxyethyl) (meth)acrylamide, N,N-(di-3-hydroxypropyl)(meth)acrylamide, N-methyl, N-ethyl(meth)acrylamide, and mixtures thereof.

Representative N,N-dialkylaminoalkyl(meth)acrylamides include but are not limited to N,N-dimethylaminoethyl (meth)acrylamide, N,N-diethylaminoethyl(meth)acrylamide, N, N-dimethylaminopropyl(meth)acrylamide, and mixtures thereof.

Hydrophobic Monomer

Hydrophobic monomers suitable for the preparation of the crosslinked, nonionic, amphiphilic polymer compositions of the disclosed technology are selected from but are not limited to one or more of esters of (meth)acrylic acid with alcohols containing 1 to 30 carbon atoms; vinyl esters of aliphatic carboxylic acids containing 1 to 22 carbon atoms; vinyl ethers of alcohols containing 1 to 22 carbon atoms; vinyl aromatics containing 8 to 20 carbon atoms; vinyl halides; vinylidene halides; linear or branched alpha-monoolefins containing 2 to 8 carbon atoms; an associative monomer having a hydrophobic end group containing 8 to 30 carbon atoms, and mixtures thereof.

Semi-Hydrophobic Monomer

Optionally, at least one semi-hydrophobic monomer can be used in the preparation of the amphiphilic polymers of the disclosed technology. A semi-hydrophobic monomer is similar in structure to an associative monomer, but has a substantially non-hydrophobic end group selected from hydroxyl or a moiety containing 1 to 4 carbon atoms.

In one aspect of the disclosed technology, the esters of (meth)acrylic acid with alcohols containing 1 to 30 carbon atoms can be represented by the following formula:

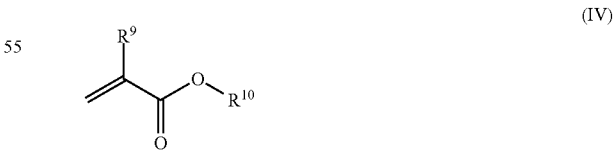
(IV)

wherein $R^9$ is hydrogen or methyl and $R^{10}$ is $C_1$ to $C_{22}$ alkyl. Representative monomers under formula (IV) include but are not limited to methyl (meth)acrylate, ethyl (meth)acrylate, butyl (meth)acrylate, sec-butyl (meth)acrylate, isobutyl (meth)acrylate, hexyl (meth)acrylate), heptyl (meth) acrylate, octyl (meth)acrylate, 2-ethylhexyl (meth)acrylate, decyl (meth)acrylate, isodecyl (meth)acrylate, lauryl (meth)

acrylate, tetradecyl (meth)acrylate, hexadecyl (meth)acrylate, stearyl (meth)acrylate, behenyl (meth)acrylate, and mixtures thereof.

Vinyl esters of aliphatic carboxylic acids containing 1 to 22 carbon atoms can be represented by the following formula:

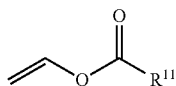

(V)

wherein $R^{11}$ is a $C_1$ to $C_{22}$ aliphatic group which can be an alkyl or alkenyl. Representative monomers under formula (V) include but are not limited to vinyl acetate, vinyl propionate, vinyl butyrate, vinyl isobutyrate, vinyl valerate, vinyl hexanoate, vinyl 2-methylhexanoate, vinyl 2-ethylhexanoate, vinyl iso-octanoate, vinyl nonanoate, vinyl neodecanoate, vinyl decanoate, vinyl versatate, vinyl laurate, vinyl palmitate, vinyl stearate, and mixtures thereof.

In one aspect, the vinyl ethers of alcohols containing 1 to 22 carbon atoms can be represented by the following formula:

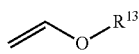

(VI)

wherein $R^{13}$ is a $C_1$ to $C_{22}$ alkyl. Representative monomers of formula (VI) include methyl vinyl ether, ethyl vinyl ether, butyl vinyl ether, isobutyl vinyl ether, 2-ethylhexyl vinyl ether, decyl vinyl ether, lauryl vinyl ether, stearyl vinyl ether, behenyl vinyl ether, and mixtures thereof.

Representative vinyl aromatic monomers include but are not limited to styrene, alpha-methylstyrene, 3-methyl styrene, 4-methyl styrene, 4-propyl styrene, 4-tert-butyl styrene, 4-n-butyl styrene, 4-n-decyl styrene, vinyl naphthalene, and mixtures thereof.

Representative vinyl and vinylidene halides include but are not limited to vinyl chloride and vinylidene chloride, and mixtures thereof.

Representative alpha-olefins include but are not limited to ethylene, propylene, 1-butene, iso-butylene, 1-hexene, and mixtures thereof.

The associative monomer of the disclosed technology has an ethylenically unsaturated end group portion (i) for addition polymerization with the other monomers of the disclosed technology; a polyoxyalkylene mid-section portion (ii) for imparting selective hydrophilic and/or hydrophobic properties to the product polymer, and a hydrophobic end group portion (iii) for providing selective hydrophobic properties to the polymer.

The portion (i) supplying the ethylenically unsaturated end group can be a residue derived from an α,β-ethylenically unsaturated monocarboxylic acid. Alternatively, portion (i) of the associative monomer can be a residue derived from an allyl ether or vinyl ether; a nonionic vinyl-substituted urethane monomer, such as disclosed in U.S. Reissue Pat. No. 33,156 or U.S. Pat. No. 5,294,692; or a vinyl-substituted urea reaction product, such as disclosed in U.S. Pat. No. 5,011,978; the relevant disclosures of each are incorporated herein by reference.

The mid-section portion (ii) is a polyoxyalkylene segment of about 2 to about 150 in one aspect, from about 10 to about 120 in another aspect, and from about 15 to about 60 in a further aspect of repeating $C_2$-$C_4$ alkylene oxide units. The mid-section portion (ii) includes polyoxyethylene, polyoxypropylene, and polyoxybutylene segments, and combinations thereof comprising from about 2 to about 150 in one aspect, from about 5 to about 120 in another aspect, and from about 10 to about 60 in a further aspect of ethylene, propylene and/or butylene oxide units, arranged in random or block sequences of ethylene oxide, propylene oxide and/or butylene oxide units.

The hydrophobic end group portion (iii) of the associative monomer is a hydrocarbon moiety belonging to one of the following hydrocarbon classes: a $C_8$-$C_{30}$ linear alkyl, a $C_8$-$C_{30}$ branched alkyl, a $C_8$-$C_{30}$ carbocyclic alkyl, a $C_2$-$C_{30}$ alkyl-substituted phenyl, an araalkyl substituted phenyl, and aryl-substituted $C_2$-$C_{30}$ alkyl groups.

Non-limiting examples of suitable hydrophobic end group portions (iii) of the associative monomers are linear or branched alkyl groups having about 8 to about 30 carbon atoms, such as capryl ($C_8$), iso-octyl (branched $C_8$), decyl ($C_{10}$), lauryl ($C_{12}$), myristyl ($C_{14}$), cetyl ($C_{16}$), cetearyl ($C_{16}$-$C_{18}$), stearyl ($C_{18}$), isostearyl (branched $C_{18}$), arachidyl ($C_{20}$), behenyl ($C_{22}$), lignoceryl ($C_{24}$), cerotyl ($C_{26}$), montanyl ($C_{28}$), melissyl ($C_{30}$), and the like.

Examples of linear and branched alkyl groups having about 8 to about 30 carbon atoms that are derived from a natural source include, without being limited thereto, alkyl groups derived from hydrogenated peanut oil, soybean oil and canola oil (all predominately $C_{18}$), hydrogenated tallow oil ($C_{16}$-$C_{18}$), and the like; and hydrogenated $C_{10}$-$C_{30}$ terpenols, such as hydrogenated geraniol (branched $C_{10}$), hydrogenated farnesol (branched $C_{15}$), hydrogenated phytol (branched $C_{20}$), and the like.

Non-limiting examples of suitable $C_2$-$C_{30}$ alkyl-substituted phenyl groups include octylphenyl, nonylphenyl, decylphenyl, dodecylphenyl, hexadecylphenyl, octadecylphenyl, isooctylphenyl, sec-butylphenyl, and the like.

Exemplary aryl-substituted $C_2$-$C_{40}$ alkyl groups include, without limitation thereto, styryl (e.g., 2-phenylethyl), distyryl (e.g., 2,4-diphenylbutyl), tristyryl (e.g., 2,4,6-triphenylhexyl), 4-phenylbutyl, 2-methyl-2-phenylethyl, tristyrylphenolyl, and the like.

Suitable $C_8$-$C_{30}$ carbocylic alkyl groups include, without being limited thereto, groups derived from sterols from animal sources, such as cholesterol, lanosterol, 7-dehydrocholesterol, and the like; from vegetable sources, such as phytosterol, stigmasterol, campesterol, and the like; and from yeast sources, such as ergosterol, mycosterol, and the like. Other carbocyclic alkyl hydrophobic end groups useful in the disclosed technology include, without being limited thereto, cyclooctyl, cyclododecyl, adamantyl, decahydronaphthyl, and groups derived from natural carbocyclic materials, such as pinene, hydrogenated retinol, camphor, isobornmyl alcohol, and the like.

Useful associative monomers can be prepared by any method known in the art. See, for example, U.S. Pat. No. 4,421,902 to Chang et al.; U.S. Pat. No. 4,384,096 to Sonnabend; U.S. Pat. No. 4,514,552 to Shay et al.; U.S. Pat. No. 4,600,761 to Ruffner et al.; U.S. Pat. No. 4,616,074 to Ruffner; U.S. Pat. No. 5,294,692 to Barron et al.; U.S. Pat. No. 5,292,843 to Jenkins et al.; U.S. Pat. No. 5,770,760 to Robinson; and U.S. Pat. No. 5,412,142 to Wilkerson, III et al.; the pertinent disclosures of which are incorporated herein by reference.

In one aspect, exemplary associative monomers include those represented by formulas (VII) and (VIIA) as follows:

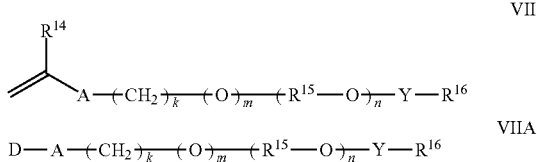

VII

VIIA wherein $R^{14}$ is hydrogen or methyl; A is —$CH_2C(O)O$—, —$C(O)O$—, —$O$—, —$CH_2O$—, —$NHC(O)NH$—, —$C(O)NH$—, —$Ar$—$(CE_2)_z$-$NHC(O)O$—, —$Ar$—$(CE_2)_z$-$NHC(O)NH$—, or —$CH_2CH_2NHC(O)$—; Ar is a divalent arylene (e.g., phenylene); E is H or methyl; z is 0 or 1; k is an integer ranging from about 0 to about 30, and m is 0 or 1, with the proviso that when k is 0, m is 0, and when k is in the range of 1 to about 30, m is 1; D represents a vinyl or an allyl moiety; $(R^{15}$—$O)_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150 in one aspect, from about 10 to about 120 in another aspect, and from about 15 to about 60 in a further aspect; Y is —$R^{15}O$—, —$R^{15}NH$—, —$C(O)$—, —$C(O)NH$—, —$R^{15}NHC(O)NH$—, or —$C(O)NHC(O)$—; $R^{16}$ is a substituted or unsubstituted alkyl selected from a $C_8$-$C_{30}$ linear alkyl, a $C_8$-$C_{30}$ branched alkyl, a $C_8$-$C_{30}$ carbocyclic alkyl, a $C_2$-$C_{30}$ alkyl-substituted phenyl, an araalkyl substituted phenyl, and an aryl-substituted $C_2$-$C_{30}$ alkyl; wherein the $R^{16}$ alkyl group, aryl group, phenyl group optionally comprises one or more substituents selected from the group consisting of a hydroxyl group, an alkoxyl group, benzyl group phenylethyl group, and a halogen group.

In one aspect, the hydrophobically modified associative monomer is an alkoxylated (meth)acrylate having a hydrophobic group containing 8 to 30 carbon atoms represented by the following formula:

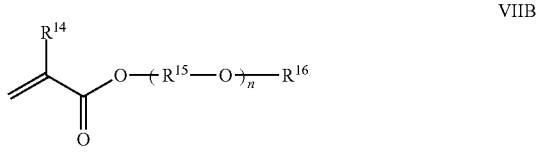

VIIB wherein $R^{14}$ is hydrogen or methyl; $R^{15}$ is a divalent alkylene moiety independently selected from $C_2H_4$, $C_3H_6$, and $C_4H_8$, and n represents an integer ranging from about 2 to about 150 in one aspect, from about 5 to about 120 in another aspect, and from about 10 to about 60 in a further aspect, ($R^{15}$—$O$) can be arranged in a random or a block configuration; $R^{16}$ is a substituted or unsubstituted alkyl selected from a $C_8$-$C_{30}$ linear alkyl, a $C_8$-$C_{30}$ branched alkyl, a $C_8$-$C_{30}$ carbocyclic alkyl, a $C_2$-$C_{30}$ alkyl-substituted phenyl, and an aryl-substituted $C_2$-$C_{30}$ alkyl.

Representative monomers under formula (VII) include lauryl polyethoxylated methacrylate (LEM), cetyl polyethoxylated methacrylate (CEM), cetearyl polyethoxylated methacrylate (CSEM), stearyl polyethoxylated (meth)acrylate, arachidyl polyethoxylated (meth)acrylate, behenyl polyethoxylated methacrylate (BEM), cerotyl polyethoxylated (meth)acrylate, montanyl polyethoxylated (meth)acrylate, melissyl polyethoxylated (meth)acrylate, phenyl polyethoxylated (meth)acrylate, nonylphenyl polyethoxylated (meth)acrylate, ω-tristyrylphenyl polyoxyethylene methacrylate, where the polyethoxylated portion of the monomer contains about 2 to about 150 ethylene oxide units in one aspect, from about 5 to about 120 in another aspect, and from about 10 to about 60 in a further aspect; octyloxy polyethyleneglycol (8) polypropyleneglycol (6) (meth)acrylate, phenoxy polyethylene glycol (6) polypropylene glycol (6) (meth)acrylate, and nonylphenoxy polyethylene glycol polypropylene glycol (meth)acrylate.

The semi-hydrophobic monomers of the disclosed technology are structurally similar to the associative monomer described above, but have a substantially non-hydrophobic end group portion. The semi-hydrophobic monomer has an ethylenically unsaturated end group portion (i) for addition polymerization with the other monomers of the disclosed technology; a polyoxyalkylene mid-section portion (ii) for imparting selective hydrophilic and/or hydrophobic properties to the product polymer and a semi-hydrophobic end group portion (iii). The unsaturated end group portion (i) supplying the vinyl or other ethylenically unsaturated end group for addition polymerization is preferably derived from an α,β-ethylenically unsaturated mono carboxylic acid. Alternatively, the end group portion (i) can be derived from an allyl ether residue, a vinyl ether residue or a residue of a nonionic urethane monomer.

The polyoxyalkylene mid-section (ii) specifically comprises a polyoxyalkylene segment, which is substantially similar to the polyoxyalkylene portion of the associative monomers described above. In one aspect, the polyoxyalkylene portions (ii) include polyoxyethylene, polyoxypropylene, and/or polyoxybutylene units comprising from about 2 to about 150 in one aspect, from about 5 to about 120 in another aspect, and from about 10 to about 60 in a further aspect of ethylene oxide, propylene oxide, and/or butylene oxide units, arranged in random or blocky sequences.

In one aspect, the semi-hydrophobic monomer can be represented by the following formulas:

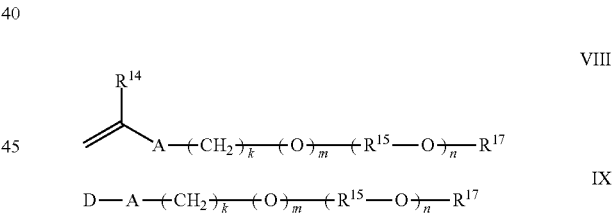

VIII

IX wherein $R^{14}$ is hydrogen or methyl; A is —$CH_2C(O)O$—, —$C(O)O$—, —$O$—, —$CH_2O$—, —$NHC(O)NH$—, —$C(O)NH$—, —$Ar$—$(CE_2)_z$-$NHC(O)O$—, —$Ar$—$(CE_2)_z$-$NHC(O)NH$—, or —$CH_2CH_2NHC(O)$—; Ar is a divalent arylene (e.g., phenylene); E is H or methyl; z is 0 or 1; k is an integer ranging from about 0 to about 30, and m is 0 or 1, with the proviso that when k is 0, m is 0, and when k is in the range of 1 to about 30, m is 1; $(R^{15}$—$O)_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150 in one aspect, from about 5 to about 120 in another aspect, and from about 10 to about 60 in a further aspect; $R^{17}$ is selected from hydrogen and a linear or branched $C_1$-$C_4$ alkyl group (e.g., methyl, ethyl, propyl, iso-propyl, butyl, iso-butyl, and tert-butyl); and D represents a vinyl or an allyl moiety.

In one aspect, the semi-hydrophobic monomer under formula VIII can be represented by the following formulas:

$$CH_2=C(R^{14})C(O)O-(C_2H_4O)_a(C_3H_6O)_b-H \qquad \text{VIIIA}$$

$$CH_2=C(R^{14})C(O)O-(C_2H_4O)_a(C_3H_6O)_b-CH_3 \qquad \text{VIIIB}$$

wherein $R^{14}$ is hydrogen or methyl, and "a" is an integer ranging from 0 or 2 to about 120 in one aspect, from about 5 to about 45 in another aspect, and from about 10 to about 0.25 in a further aspect, and "b" is an integer ranging from about 0 or 2 to about 120 in one aspect, from about 5 to about 45 in another aspect, and from about 10 to about 0.25 in a further aspect, subject to the proviso that "a" and "b" cannot be 0 at the same time.

Examples of semi-hydrophobic monomers under formula VIIIA include polyethyleneglycol methacrylate available under the product names Blemmer® PE-90 ($R^{14}$=methyl, a=2, b=0), PE-200 ($R^{14}$=methyl, a=4.5, b=0), and PE-350 ($R^{14}$=methyl a=8, b=0); polypropylene glycol methacrylate available under the product names Blemmer® PP-1000 ($R^{14}$=methyl, b=4-6, a=0), PP-500 ($R^{14}$=methyl, a=0, b=9), PP-800 ($R^{14}$=methyl, a=0, b=13); polyethyleneglycol polypropylene glycol methacrylate available under the product names Blemmer® 50PEP-300 ($R^{14}$=methyl, a=3.5, b=2.5), 70PEP-350B ($R^{14}$=methyl, a=5, b=2); polyethyleneglycol acrylate available under the product names Blemmer® AE-90 ($R^{14}$=hydrogen, a=2, b=0), AE-200 ($R^{14}$=hydrogen, a=2, b=4.5), AE-400 ($R^{14}$=hydrogen, a=10, b=0); polypropyleneglycol acrylate available under the product names Blemmer® AP-150 ($R^{14}$=hydrogen, a=0, b=3), AP-400 ($R^{14}$=hydrogen, a=0, b=6), AP-550 ($R^{14}$=hydrogen, a=0, b=9). Blemmer® is a trademark of NOF Corporation, Tokyo, Japan.

Examples of semi-hydrophobic monomers under formula VIIIB include methoxypolyethyleneglycol methacrylate available under the product names Visiomer® MPEG 750 MAW ($R^{14}$=methyl, a=17, b=0), MPEG 1005 MA W ($R^{14}$=methyl, a=22, b=0), MPEG 2005 MA W ($R^{14}$=methyl, a=45, b=0), and MPEG 5005 MA W ($R^{14}$=methyl, a=113, b=0) from Evonik Röhm GmbH, Darmstadt, Germany); Bisomer® MPEG 350 MA ($R^{14}$=methyl, a=8, b=0), and MPEG 550 MA ($R^{14}$=methyl, a=12, b=0) from GEO Specialty Chemicals, Ambler Pa.; Blemmer® PME-100 ($R^{14}$=methyl, a=2, b=0), PME-200 ($R^{14}$=methyl, a=4, b=0), PME400 ($R^{14}$=methyl, a=9, b=0), PME-1000 ($R^{14}$=methyl, a=23, b=0), PME-4000 ($R^{14}$=methyl, a=90, b=0).

In one aspect, the semi-hydrophobic monomer set forth in formula IX can be represented by the following formulas:

$$CH_2=CH-O-(CH_2)_d-O-(C_3H_6O)_e-(C_2H_4O)_f-H \qquad \text{IXA}$$

$$CH_2=CH-CH_2-O-(C_3H_6O)_g-(C_2H_4O)_h-H \qquad \text{IXB}$$

wherein d is an integer of 2, 3, or 4; e is an integer in the range of from about 1 to about 10 in one aspect, from about 2 to about 8 in another aspect, and from about 3 to about 7 in a further aspect; f is an integer in the range of from about 5 to about 50 in one aspect, from about 8 to about 40 in another aspect, and from about 10 to about 30 in a further aspect; g is an integer in the range of from 1 to about 10 in one aspect, from about 2 to about 8 in another aspect, and from about 3 to about 7 in a further aspect; and h is an integer in the range of from about 5 to about 50 in one aspect, and from about 8 to about 40 in another aspect; e, f, g, and h can be 0 subject to the proviso that e and f cannot be 0 at the same time, and g and h cannot be 0 at the same time.

Monomers under formulas IXA and IXB are commercially available under the trade names Emulsogen® R109, R208, R307, RAL109, RAL208, and RAL307 sold by Clariant Corporation; BX-AA-E5P5 sold by Bimax, Inc.; and combinations thereof. EMULSOGEN® R109 is a randomly ethoxylated/propoxylated 1,4-butanediol vinyl ether having the empirical formula $CH_2=CH-O(CH_2)_4O(C_3H_6O)_4(C_2H_4O)_{10}H$; Emulsogen® R208 is a randomly ethoxylated/propoxylated 1,4-butanediol vinyl ether having the empirical formula $CH_2=CH-O(CH_2)_4O(C_3H_6O)_4(C_2H_4O)_{20}H$; Emulsogen® R307 is a randomly ethoxylated/propoxylated 1,4-butanediol vinyl ether having the empirical formula $CH_2=CH-O(CH_2)_4O(C_3H_6O)_4(C_2H_4O)_{30}H$; Emulsogen® RAL109 is a randomly ethoxylated/propoxylated allyl ether having the empirical formula $CH_2=CHCH_2O(C_3H_6O)_4(C_2H_4O)_{10}H$; Emulsogen® RAL208 is a randomly ethoxylated/propoxylated allyl ether having the empirical formula $CH_2=CHCH_2O(C_3H_6O)_4(C_2H_4O)_{20}H$; Emulsogen® RAL307 is a randomly ethoxylated/propoxylated allyl ether having the empirical formula $CH_2=CHCH_2O(C_3H_6O)_4(C_2H_4O)_{30}H$; and BX-AA-E5P5 is a randomly ethoxylated/propoxylated allyl ether having the empirical formula $CH_2=CHCH_2O(C_3H_6O)_5(C_2H_4O)_5H$.

In the associative and semi-hydrophobic monomers of the disclosed technology, the polyoxyalkylene mid-section portion contained in these monomers can be utilized to tailor the hydrophilicity and/or hydrophobicity of the polymers in which they are included. For example, mid-section portions rich in ethylene oxide moieties are more hydrophilic while mid-section portions rich in propylene oxide moieties are more hydrophobic. By adjusting the relative amounts of ethylene oxide to propylene oxide moieties present in these monomers the hydrophilic and hydrophobic properties of the polymers in which these monomers are included can be tailored as desired.

The amount of associative and/or semi-hydrophobic monomer utilized in the preparation of the polymers of the disclosed technology can vary widely and depends, among other things, on the final rheological and aesthetic properties desired in the polymer. When utilized, the monomer reaction mixture contains one or more monomers selected from the associative and/or semi-hydrophobic monomers disclosed above in amounts ranging from about 0.01 to about 15 wt. % in one aspect, from about 0.1 wt. % to about 10 wt. % in another aspect, from about 0.5 to about 8 wt. % in still another aspect and from about 1, 2 or 3 to about 5 wt. % in a further aspect, based on the weight of the total monomers.

Ionizable Monomer

In one aspect of the disclosed technology, the crosslinked, nonionic, amphiphilic polymer compositions of the disclosed technology can be polymerized from a monomer composition including 0 to 5 wt. % of an ionizable and/or ionized monomer, based on the weight of the total monomers, so long as the yield stress value of the yield stress fluids in which the polymers of the disclosed technology are included are not deleteriously affected (i.e., the yield stress value of the fluid does not fall below 1 mPa, or 0.001 Pa).

In another aspect, the amphiphilic polymer compositions of the disclosed technology can be polymerized from a monomer composition comprising less than 3 wt. % in one aspect, less than 1 wt. % in a further aspect, less than 0.5 wt. % in a still further aspect, less than 0.1 wt. % in an additional aspect, and less than 0.05 wt. % in a further aspect, of an ionizable and/or an ionized moiety, based on the weight of the total monomers.

Ionizable monomers include monomers having a base neutralizable moiety and monomers having an acid neutralizable moiety. Base neutralizable monomers include olefinically unsaturated monocarboxylic and dicarboxylic acids and their salts containing 3 to 5 carbon atoms and anhydrides thereof. Examples include (meth)acrylic acid, itaconic acid, maleic acid, maleic anhydride, and combinations thereof. Other acidic monomers include styrenesulfonic acid, acrylamidomethylpropanesulfonic acid (AMPS® monomer), vinylsulfonic acid, vinylphosphonic acid, allylsulfonic acid, methallylsulfonic acid; and salts thereof.

Acid neutralizable monomers include olefinically unsaturated monomers which contain a basic nitrogen atom capable of forming a salt or a quaternized moiety upon the addition of an acid. For example, these monomers include vinylpyridine, vinylpiperidine, vinylimidazole, vinylmethylimidazole, dimethylaminomethyl (meth)acrylate, dimethylaminoethyl (meth)acrylate, diethylaminomethyl (meth)acrylate and methacrylate, dimethylaminoneopentyl (meth)acrylate, dimethylaminopropyl (meth)acrylate, and diethylaminoethyl (meth)acrylate.

Crosslinking Monomer

In one embodiment, the crosslinked, nonionic, amphiphilic polymers useful in the practice of the disclosed technology are polymerized from a monomer composition comprising a first monomer comprising at least one nonionic, hydrophilic unsaturated monomer, at least one nonionic, unsaturated hydrophobic monomer, and mixtures thereof, and a third monomer comprising at least one polyunsaturated crosslinking monomer. The crosslinking monomer(s) is utilized to polymerize covalent crosslinks into the polymer backbone. The crosslinking monomer can be an amphiphilic crosslinking agent or a mixture of an amphiphilic crosslinking agent and a conventional crosslinking agent.

The crosslinking monomer can be an amphiphilic crosslinking agent. The amphiphilic crosslinking agent is utilized to polymerize covalent crosslinks into the amphiphilic polymer backbone. In some instances, conventional crosslinking agents can affect the volume expansion or swelling of micro-gel particles in fluids containing surfactants. For example, a high level of conventional crosslinking agent could provide a high yield stress but the limited expansion of the micro-gels would result in undesirably high polymer use levels and low optical clarity. On the other hand, a low level of conventional crosslinking agents could give high optical clarity but low yield stress. It is desirable that polymeric micro-gels allow maximum swelling while maintaining a desirable yield stress, and it has been found that the use of amphiphilic crosslinking agents in place of, or in conjunction with conventional crosslinking agents can provide just these benefits. In addition, it has been found that the amphiphilic crosslinking agent can be easily reacted into the amphiphilic polymer. Often, certain processing techniques, such as staging, can be required with conventional crosslinking agents to achieve the proper balance of optical clarity and yield stress. In contrast, it has been found that amphiphilic crosslinking agents can simply be added in a single stage with the monomer mixture.

Amphiphilic crosslinking agents are a subset of compounds known in the art as reactive surfactants. Reactive surfactants are surface acting agents containing at least one reactive moiety so that they can covalently link to the surface of polymeric particles. By linking to particles, the reactive surfactants can improve the colloidal stability of latex particles due to the surfactant's resistance to desorbing from the particle surface. Reactive surfactants in the art commonly only have, or only need, one reactive moiety to prevent such desorption.

As a subset of reactive surfactants, amphiphilic crosslinking agents as used herein are those compounds or mixtures thereof that include more than one reactive moiety. It has surprisingly been found that such amphiphilic crosslinking agents not only can be employed to improve stability of particles, but can be efficiently employed to prepare yield stress fluids as described herein.

The art is replete with disclosures on various types of reactive surfactants, and one of ordinary skill in the art could readily determine which include more than one reactive moiety such that they can be employed herein as amphiphilic crosslinking agents without undue experimentation. Exemplary non-limiting amphiphilic crosslinking agents can be seen, for example, in U.S. Pat. No. 3,541,138 (issued Nov. 17, 1970 to Emmons et al.), U.S. Pat. No. 6,262,152 (issued Jul. 17, 2001 to Fryd et al.), U.S. Pat. No. 8,354,488 (issued Jan. 15, 2013 to Li et al.), WO2002/100525 (published Dec. 19, 2002 to Syngenta), and the like.

The amphiphilic crosslinking agent contains a hydrophobic moiety and a hydrophilic moiety. The hydrophobic moiety will provide solubility in oils, and the hydrophilic moiety will provide water solubility. Hydrophobic and hydrophilic moieties are well known to those skilled in the art.

Non-limiting examples of hydrophobic moieties of the amphiphilic crosslinking agent can be derived from functional groups such as alkyl, aryl, and alkyl aryl acrylates or methacrylates having 1-12 carbon atoms in the alkyl group and/or 6-12 carbons in the aryl group such as methyl, ethyl, butyl, propyl, isobutyl, hexyl, 2-ethyl hexyl, nonyl, lauryl, isobornyl, benzyl acrylates and methacrylates and the like; polymerizable vinyl aromatic monomers such as styrene, alpha methyl styrene, vinyl toluene and the like; and aliphatic hydrocarbon monomers such as isoprene and butadiene. Regardless of the constituent functional groups from which the hydrophobic moiety of the amphiphilic crosslinking agent is derived, the hydrophobic moiety will have limited solubility in water, which one of ordinary skill in the art would readily envisage. Examples of functional groups for preparing hydrophobic moieties can include, for example, alkyl phenols, stearyls, lauryls, tri-styryl phenols, groups derived from natural oils, and the like.

Non-limiting examples of hydrophilic moieties of the amphiphilic crosslinking agent can be functional groups such as ethoxylates, hydroxyls, amidos, aminos, phosphates, phosponates, sulfates, sulfonates, carboxylates and the like. Such hydrophilic moieties of the amphiphilic crosslinking agent can be derived from, for example, acid monomers such as acrylic acid, methacrylic acid, acrylamidomethylpropane sulfonic acid, itaconic acid, maleic acid and styrene sulfonic acid and esters thereof; amine-containing monomers such as 2-dimethylaminoethyl methacrylate, 2-dimethylaminoethyl acrylate, 2-diethylaminoethyl methacrylate, and 2-diethylaminoethyl acrylate; and monomers having oligoether moieties of the general formula:

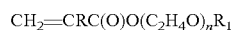

$$CH_2=CRC(O)O(C_2H_4O)_nR_1$$

wherein R=H or methyl; $R_1$=alkyl of 1 to 4 carbon atoms, aryl of 6 to 12 carbon atoms, or alkyl-aryl, and n=1 to 20, examples of which include ethoxyethyl methacrylate, butoxyethyl methacrylate, ethoxytriethylene methacrylate, methoxy-polyethylene glycol methacrylate, and 2-ethoxytriethylene glycol methacrylate.

Additionally, the amphiphilic crosslinking agent contains multiple crosslinking moieties. Non-limiting examples of crosslinking moieties can include those shown in Table I

TABLE I

| Functional Group | Crosslinking Group |
| --- | --- |
| epoxy | amine, anhydride, acid, phenolic, hydroxyl, N-methylol, aldehyde, acetoacetoxy |
| hydroxyl | isocyanate, epoxide, N-methylol, anhydride, ester |
| anhydride | epoxide, amine, hydroxyl |
| cyclic carbonate | amine |
| activated allyl | amine, radical inhibitor |
| amine | aldehyde, epoxide, anhydride, isocyanate, ester, acetoacetoxy, activated allyl |
| silane, silicate, silanol, silicone | hydroxyl, water, acid, isocyanate, silane, silicate |
| imine | aldehyde, epoxide, anhydride, isocyanate, ester, acetoacetoxy, activated allyl |

Further non-limiting examples of crosslinking moieties can include unsaturated moieties. In an embodiment, the amphiphilic crosslinking agent contains more than one unsaturated moiety, or at least two unsaturated moieties. In one aspect, the amphiphilic crosslinking agent is a polyunsaturated compound containing at least 2 unsaturated moieties. In another aspect, the amphiphilic crosslinking agent contains at least 3 unsaturated moieties.

Mixtures of two or more amphiphilic crosslinking agents can also be utilized to crosslink the nonionic, amphiphilic polymers. In one aspect, the mixture of amphiphilic crosslinking agent contains more than one unsaturated moieties, or an average of 1.5 or 2 unsaturated moieties. In another aspect, the mixture of amphiphilic crosslinking agents contains an average of 2.5 unsaturated moieties. In still another aspect, the mixture of amphiphilic crosslinking agents contains an average of about 3 unsaturated moieties. In a further aspect, the mixture of amphiphilic crosslinking agents contains an average of about 3.5 unsaturated moieties.

In one aspect, exemplary amphiphilic crosslinking agents suitable for use with the present technology can include, but not be limited to, compounds such as those disclosed in US 2013/0047892 (published Feb. 28, 2013 to Palmer, Jr. et al.), represented by the following formulas:

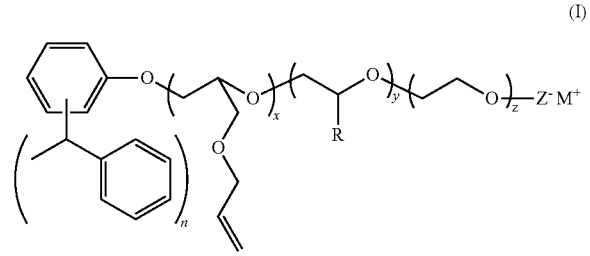

(I)

where R=CH$_3$, CH$_2$CH$_3$, C$_6$H$_5$, or C$_{14}$H$_{29}$; n=1, 2, or 3; x is 2-10, y is 0-200, z is 4-200, more preferably from about 5 to 60, and most preferably from about 5 to 40; Z can be either SO$_3^-$ or PO$_3^{2-}$, and M$^+$ is Na$^+$, K$^+$, NH$_4^+$, or an alkanolamine such as, for example, monoethanolamine, diethanolamine, and triethanolamine;

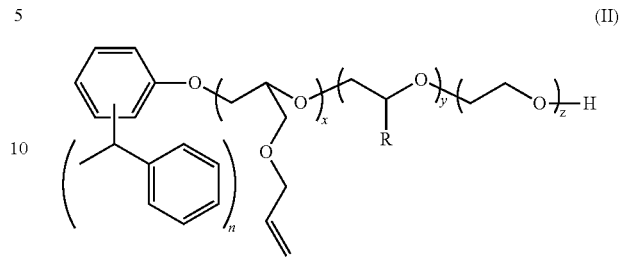

(II)

where R=CH$_3$, CH$_2$CH$_3$, C$_6$H$_5$, or C$_{14}$H$_{29}$; n=1, 2, 3; x is 2-10, y is 0-200, z is 4-200, more preferably from about 5 to 60, and most preferably from about 5 to 40;

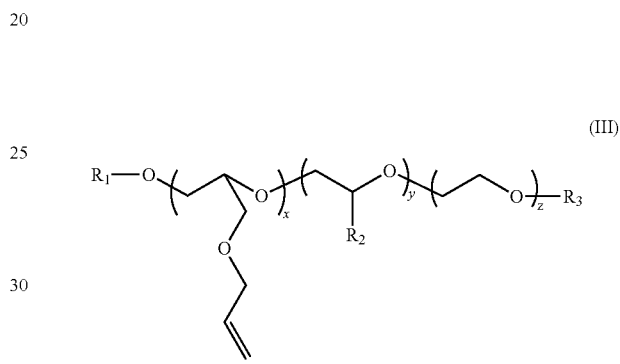

(III)

where R$_1$ is a C$_{10-24}$ alkyl, alkaryl, alkenyl, or cycloalkyl, R$_2$=CH$_3$, CH$_2$CH$_3$, C$_6$H$_5$, or C$_{14}$H$_{29}$; x is 2-10, y is 0-200, z is 4-200, more preferably from about 5 to 60, and most preferably from about 5 to 40; and R$^3$ is H or Z$^-$ M$^+$ Z can be either SO$_3$— or PO$_3^{2-}$, and M$^+$ is Na$^+$, K$^+$, NH$_4^+$, or an alkanolamine such as, for example, monoethanolamine, diethanolamine, and triethanolamine.

The foregoing amphiphilic crosslinking agents conforming to formulas (I), (II), (III), (IV) and (V) are disclosed in U.S. Patent Application Publication No. US 2014/0114006, the disclosure of which is herein incorporated by reference, and are commercially available under the E-Sperse™ RS Series trade name (e.g., product designations RS-1617, RS-1618, RS-1684) from Ethox Chemicals, LLC.

In one embodiment, the amphiphilic crosslinking agent can be used in an amount ranging from about 0.01 to about 3 wt. % in one aspect, from about 0.05 to about 0.1 wt. % in another aspect, and from about 0.1 to about 0.75 wt. % in a further aspect, based on the dry weight of the nonionic, amphiphilic polymer of the disclosed technology.

In another embodiment, the amphiphilic crosslinking agent can contain an average of about 1.5 or 2 unsaturated moieties and can be used in an amount ranging from about 0.01 to about 3 wt. % in one aspect, from about 0.02 to about 1 wt. % in another aspect, from about 0.05 to about 0.75 wt. % in a further aspect, and from about 0.075 to about 0.5 wt. % in a still further aspect, and from about 0.1 to about 0.15 wt. % in another aspect, based upon the total weight of the, nonionic, amphiphilic polymer of the disclosed technology.

In one aspect, the amphiphilic crosslinking agent is selected from compounds of formulas (III), (IV) or (V).

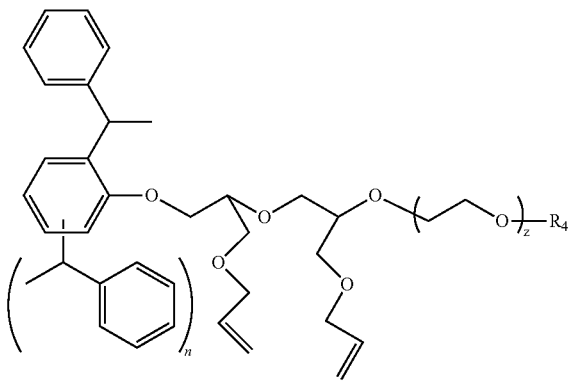

(IV)

where n is 1 or 2; z is 4 to 40 in one aspect, 5 to 38 in another aspect, and 10 to 20 in a further aspect; and $R_4$ is H, $SO_3^-M^+$ or $PO_3^-M^+$, and M is selected from Na, K, and $NH_4$.

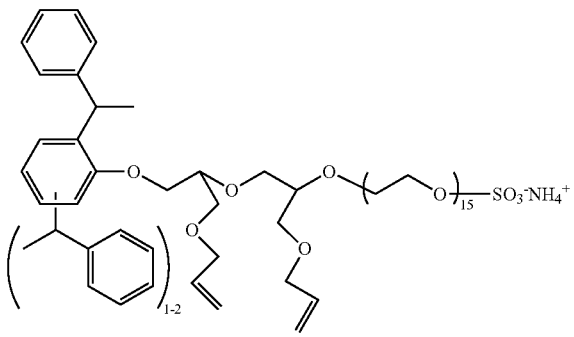

(V)

In one embodiment, the crosslinking monomer can include a combination of an amphiphilic crosslinking agent and a conventional crosslinking agent. In one aspect, the conventional crosslinking agent is a polyunsaturated compound containing at least 2 unsaturated moieties. In another aspect, the conventional crosslinking agent contains at least 3 unsaturated moieties. Exemplary polyunsaturated compounds include di(meth)acrylate compounds such as ethylene glycol di(meth)acrylate, polyethylene glycol di(meth)acrylate, triethylene glycol di(meth)acrylate, 1,3-butylene glycol di(meth)acrylate, 1,6-butylene glycol di(meth)acrylate, 1,6-hexanediol di(meth)acrylate, neopentyl glycol di(meth)acrylate, 1,9-nonanediol di(meth)acrylate, 2,2'-bis (4-(acryloxy-propyloxyphenyl)propane, and 2,2'-bis(4-(acryloxydiethoxy-phenyl)propane; tri(meth)acrylate compounds such as, trimethylolpropane tri(meth)acrylate, trimethylolethane tri(meth)acrylate, and tetramethylolmethane tri(meth)acrylate; tetra(meth)acrylate compounds such as ditrimethylolpropane tetra(meth)acrylate, tetramethylolmethane tetra(meth)acrylate, and pentaerythritol tetra(meth)acrylate; hexa(meth)acrylate compounds such as dipentaerythritol hexa(meth)acrylate; allyl compounds such as allyl (meth)acrylate, diallylphthalate, diallyl itaconate, diallyl fumarate, and diallyl maleate; polyallyl ethers of sucrose having from 2 to 8 allyl groups per molecule, polyallyl ethers of pentaerythritol such as pentaerythritol diallyl ether, pentaerythritol triallyl ether, and pentaerythritol tetraallyl ether, and combinations thereof; polyallyl ethers of trimethylolpropane such as trimethylolpropane diallyl ether, trimethylolpropane triallyl ether, and combinations thereof. Other suitable polyunsaturated compounds include divinyl glycol, divinyl benzene, and methylenebisacrylamide.

In another aspect, suitable polyunsaturated monomers can be synthesized via an esterification reaction of a polyol made from ethylene oxide or propylene oxide or combinations thereof with unsaturated anhydride such as maleic anhydride, citraconic anhydride, itaconic anhydride, or an addition reaction with unsaturated isocyanate such as 3-isopropenyl-α-α-dimethylbenzene isocyanate.

Mixtures of two or more of the foregoing polyunsaturated compounds can also be utilized to crosslink the nonionic, amphiphilic polymers. In one aspect, the mixture of conventional unsaturated crosslinking monomer contains an average of 2 unsaturated moieties. In another aspect, the mixture of conventional crosslinking agents contains an average of 2.5 unsaturated moieties. In still another aspect, the mixture of conventional crosslinking agents contains an average of about 3 unsaturated moieties. In a further aspect, the mixture of conventional crosslinking agents contains an average of about 3.5 unsaturated moieties.

In one embodiment, the conventional crosslinking agent component can be used in an amount ranging from about 0.01 to about 1 wt. % in one aspect, from about 0.05 to about 0.75 wt. % in another aspect, and from about 0.1 to about 0.5 wt. % in a further aspect, based on the dry weight of the nonionic, amphiphilic polymer of the disclosed technology.

In another embodiment of the disclosed technology, the conventional crosslinking agent component contains an average of about 3 unsaturated moieties and can be used in an amount ranging from about 0.01 to about 0.3 wt. % in one aspect, from about 0.02 to about 0.25 wt. % in another aspect, from about 0.05 to about 0.2 wt. % in a further aspect, and from about 0.075 to about 0.175 wt. % in a still further aspect, and from about 0.1 to about 0.15 wt. % in another aspect, based upon the total weight of the, nonionic, amphiphilic polymer of the disclosed technology.

In one aspect, the conventional crosslinking agent is selected from trimethylolpropane tri(meth)acrylate, trimethylolethane tri(meth)acrylate, tetramethylolmethane tri (meth)acrylate, pentaerythritol triallylether and polyallyl ethers of sucrose having 3 allyl groups per molecule.

In another aspect, the nonionic amphiphilic polymer can be crosslinked with a combination of a conventional crosslinking agent and an amphiphilic crosslinking agent. The conventional crosslinking agent and amphiphilic crosslinking agent can be used in a total amount ranging from about 0.01 to about 1 wt. % in one aspect, from about 0.05 to about 0.75 wt. % in another aspect, and from about 0.1 to about 0.5 wt. % in a further aspect, based on the dry weight of the nonionic, amphiphilic polymer of the disclosed technology.

In another embodiment, the combination of the conventional crosslinking agent and amphiphilic crosslinking agent can contain an average of about 2 or 3 unsaturated moieties and can be used in an amount ranging from about 0.01 to about 2 wt. % in one aspect, from about 0.02 to about 0.3 wt. % in another aspect, from about 0.05 to about 0.2 wt. % in a further aspect, and from about 0.075 to about 0.175 wt. % in a still further aspect, and from about 0.1 to about 0.15 wt. % in another aspect, based upon the total weight of the, nonionic, amphiphilic polymer of the disclosed technology.

In one aspect, the combination of the conventional crosslinking agent and amphiphilic crosslinking agent can include conventional crosslinking agents selected from selected from trimethylolpropane tri(meth)acrylate, trimethylolethane tri(meth)acrylate, tetramethylolmethane tri(meth)

acrylate, pentaerythritol triallylether and polyallyl ethers of sucrose having 3 allyl groups per molecule, and combinations thereof, and amphiphilic crosslinking agents selected from compounds of formula (III), (V), and combinations thereof.

Amphiphilic Polymer Synthesis

The crosslinked, nonionic, amphiphilic polymer of the disclosed technology can be made using conventional free-radical emulsion polymerization techniques. The polymerization processes are carried out in the absence of oxygen under an inert atmosphere such as nitrogen. The polymerization can be carried out in a suitable solvent system such as water. Minor amounts of a hydrocarbon solvent, organic solvent, as well as mixtures thereof can be employed. The polymerization reactions are initiated by any means which results in the generation of a suitable free-radical. Thermally derived radicals, in which the radical species is generated from thermal, homolytic dissociation of peroxides, hydroperoxides, persulfates, percarbonates, peroxyesters, hydrogen peroxide and azo compounds can be utilized. The initiators can be water soluble or water insoluble depending on the solvent system employed for the polymerization reaction.

The initiator compounds can be utilized in an amount of up to 30 wt. % in one aspect, 0.01 to 10 wt. % in another aspect, and 0.2 to 3 wt. % in a further aspect, based on the total weight of the dry polymer.

Exemplary free radical water soluble initiators include, but are not limited to, inorganic persulfate compounds, such as ammonium persulfate, potassium persulfate, and sodium persulfate; peroxides such as hydrogen peroxide, benzoyl peroxide, acetyl peroxide, and lauryl peroxide; organic hydroperoxides, such as cumene hydroperoxide and t-butyl hydroperoxide; organic peracids, such as peracetic acid, and water soluble azo compounds, such as 2,2'-azobis(tert-alkyl) compounds having a water solubilizing substituent on the alkyl group. Exemplary free radical oil soluble compounds include, but are not limited to 2,2'-azobisisobutyronitrile, and the like. The peroxides and peracids can optionally be activated with reducing agents, such as sodium bisulfite, sodium formaldehyde, or ascorbic acid, transition metals, hydrazine, and the like.

In one aspect, azo polymerization catalysts include the Vazo® free-radical polymerization initiators, available from DuPont, such as Vazo® 44 (2,2'-azobis(2-(4,5-dihydroimidazolyl)propane), Vazo® 56 (2,2'-azobis(2-methylpropionamidine) dihydrochloride), Vazo® 67 (2,2'-azobis(2-methylbutyronitrile)), and Vazo® 68 (4,4'-azobis(4-cyanovaleric acid)).

Optionally, the use of known redox initiator systems as polymerization initiators can be employed. Such redox initiator systems include an oxidant (intiator) and a reductant. Suitable oxidants include, for example, hydrogen peroxide, sodium peroxide, potassium peroxide, t-butyl hydroperoxide, t-amyl hydroperoxide, cumene hydroperoxide, sodium perborate, perphosphoric acid and salts thereof, potassium permanganate, and ammonium or alkali metal salts of peroxydisulfuric acid, typically at a level of 0.01% to 3.0% by weight, based on dry polymer weight, are used. Suitable reductants include, for example, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, ascorbic acid, isoascorbic acid, lactic acid, glyceric acid, malic acid, 2-hydroxy-2-sulfinatoacetic acid, tartaric acid and salts of the preceding acids typically at a level of 0.01% to 3.0% by weight, based on dry polymer weight, is used. In one aspect, combinations of peroxodisulfates with alkali metal or ammonium bisulfites can be used, for example, ammonium peroxodisulfate and ammonium bisulfite. In another aspect, combinations of hydrogen peroxide containing compounds (t-butyl hydroperoxide) as the oxidant with ascorbic or erythorbic acid as the reductant can be utilized. The ratio of peroxide-containing compound to reductant is within the range from 30:1 to 0.05:1.

In emulsion polymerization processes it can be advantageous to stabilize the monomer/polymer droplets or particles by means of surface active auxiliaries. Typically, these are emulsifiers or protective colloids. Emulsifiers used can be anionic, nonionic, cationic or amphoteric. Examples of anionic emulsifiers are alkylbenzenesulfonic acids, sulfonated fatty acids, sulfosuccinates, fatty alcohol sulfates, alkylphenol sulfates and fatty alcohol ether sulfates. Examples of usable nonionic emulsifiers are alkylphenol ethoxylates, primary alcohol ethoxylates, fatty acid ethoxylates, alkanolamide ethoxylates, fatty amine ethoxylates, EO/PO block copolymers and alkylpolyglucosides. Examples of cationic and amphoteric emulsifiers used are quaternized amine alkoxylates, alkylbetaines, alkylamidobetaines and sulfobetaines.

Examples of typical protective colloids are cellulose derivatives, polyethylene glycol, polypropylene glycol, copolymers of ethylene glycol and propylene glycol, polyvinyl acetate, poly(vinyl alcohol), partially hydrolyzed poly(vinyl alcohol), polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid or anhydride copolymers. The emulsifiers or protective colloids are customarily used in concentrations from 0.05 to 20 wt. %, based on the weight of the total monomers.

The polymerization reaction can be carried out at temperatures ranging from 20 to 200° C. in one aspect, from 50 to 150° C. in another aspect, and from 60 to 100° C. in a further aspect.

The polymerization can be carried out the presence of chain transfer agents. Suitable chain transfer agents include, but are not limited to, thio- and disulfide containing compounds, such as $C_1$-$C_{18}$ alkyl mercaptans, such as tert-butyl mercaptan, n-octyl mercaptan, n-dodecyl mercaptan, tert-dodecyl mercaptan hexadecyl mercaptan, octadecyl mercaptan; mercaptoalcohols, such as 2-mercaptoethanol, 2-mercaptopropanol; mercaptocarboxylic acids, such as mercaptoacetic acid and 3-mercaptopropionic acid; mercaptocarboxylic acid esters, such as butyl thioglycolate, isooctyl thioglycolate, dodecyl thioglycolate, isooctyl 3-mercaptopropionate, and butyl 3-mercaptopropionate; thioesters; $C_1$-$C_{18}$ alkyl disulfides; aryldisulfides; polyfunctional thiols such as trimethylolpropane-tris-(3-mercaptopropionate), pentaerythritol-tetra-(3-mercaptopropionate), pentaerythritol-tetra-(thioglycolate), pentaerythritol-tetra-(thiolactate), dipentaerythritol-hexa-(thioglycolate), and the like; phosphites and hypophosphites; $C_1$-$C_4$ aldehydes, such as formaldehyde, acetaldehyde, propionaldehyde; haloalkyl compounds, such as carbon tetrachloride, bromotrichloromethane, and the like; hydroxylammonium salts such as hydroxylammonium sulfate; formic acid; sodium bisulfite; isopropanol; and catalytic chain transfer agents such as, for example, cobalt complexes (e.g., cobalt (II) chelates).

The chain transfer agents are generally used in amounts ranging from 0.1 to 10 wt. %, based on the total weight of the monomers present in the polymerization medium.

Emulsion Process

In one exemplary aspect of the disclosed technology, the crosslinked, nonionic, amphiphilic polymer is polymerized via an emulsion process. The emulsion process can be conducted in a single reactor or in multiple reactors as is well-known in the art. The monomers can be added as a batch mixture or each monomer can be metered into the reactor in a staged process. A typical mixture in emulsion polymerization comprises water, monomer(s), an initiator (usually water-soluble) and an emulsifier. The monomers may be emulsion polymerized in a single-stage, two-stage or multi-stage polymerization process according to well-known methods in the emulsion polymerization art. In a two-stage polymerization process, the first stage monomers are added and polymerized first in the aqueous medium, followed by addition and polymerization of the second stage monomers. The aqueous medium optionally can contain an organic solvent. If utilized, the organic solvent is less than about 5 wt. % of the aqueous medium. Suitable examples of water-miscible organic solvents include, without limitation, esters, alkylene glycol ethers, alkylene glycol ether esters, lower molecular weight aliphatic alcohols, and the like.

To facilitate emulsification of the monomer mixture, the emulsion polymerization is carried out in the presence of at least one stabilizing surfactant. The term "stabilizing surfactant" is used in the context of surfactants employed to facilitate emulsification. In one embodiment, the emulsion polymerization is carried out in the presence of stabilizing surfactant (active weight basis) ranging in the amount of about 0.2% to about 5% by weight in one aspect, from about 0.5% to about 3% in another aspect, and from about 1% to about 2% by weight in a further aspect, based on a total monomer weight basis. The emulsion polymerization reaction mixture also includes one or more free radical initiators which are present in an amount ranging from about 0.01% to about 3% by weight based on total monomer weight. The polymerization can be performed in an aqueous or aqueous alcohol medium. Stabilizing surfactants for facilitating the emulsion polymerization include anionic, nonionic, amphoteric, and cationic surfactants, as well as reactive derivatives thereof, and mixtures thereof. By "reactive derivatives thereof" it is meant surfactants, or mixtures of surfactants, having on average less than one reactive moiety. Most commonly, anionic and nonionic surfactants can be utilized as stabilizing surfactants as well as mixtures thereof.

Suitable anionic surfactants for facilitating emulsion polymerizations are well known in the art and include, but are not limited to ($C_6$-$C_{18}$) alkyl sulfates, ($C_6$-$C_{18}$) alkyl ether sulfates (e.g., sodium lauryl sulfate and sodium laureth sulfate), amino and alkali metal salts of dodecylbenzenesulfonic acid, such as sodium dodecyl benzene sulfonate and dimethylethanolamine dodecylbenzenesulfonate, sodium ($C_8$-$C_{16}$) alkyl phenoxy benzene sulfonate, disodium ($C_8$-$C_{16}$) alkyl phenoxy benzene sulfonate, disodium ($C_6$-$C_{16}$) di-alkyl phenoxy benzene sulfonate, disodium laureth-3 sulfosuccinate, sodium dioctyl sulfosuccinate, sodium di-sec-butyl naphthalene sulfonate, disodium dodecyl diphenyl ether sulfonate, disodium n-octadecyl sulfosuccinate, phosphate esters of branched alcohol ethoxylates, and the like, as well as reactive derivatives thereof.

Nonionic surfactants suitable for facilitating emulsion polymerizations are well known in the polymer art, and include, without limitation, linear or branched $C_8$-$C_{30}$ fatty alcohol ethoxylates, such as capryl alcohol ethoxylate, lauryl alcohol ethoxylate, myristyl alcohol ethoxylate, cetyl alcohol ethoxylate, stearyl alcohol ethoxylate, cetearyl alcohol ethoxylate, sterol ethoxylate, oleyl alcohol ethoxylate, and, behenyl alcohol ethoxylate; alkylphenol alkoxylates, such as octylphenol ethoxylates; and polyoxyethylene polyoxypropylene block copolymers, and the like, as well as reactive derivatives thereof. Additional fatty alcohol ethoxylates suitable as non-ionic surfactants are described below. Other useful nonionic surfactants include $C_8$-$C_{22}$ fatty acid esters of polyoxyethylene glycol, ethoxylated mono- and diglycerides, sorbitan esters and ethoxylated sorbitan esters, $C_8$-$C_{22}$ fatty acid glycol esters, block copolymers of ethylene oxide and propylene oxide, and combinations thereof, as well as reactive derivatives thereof. The number of ethylene oxide units in each of the foregoing ethoxylates can range from 2 and above in one aspect, and from 2 to about 150 in another aspect.

Optionally, other emulsion polymerization additives and processing aids which are well known in the emulsion polymerization art, such as auxiliary emulsifiers, protective colloids, solvents, buffering agents, chelating agents, inorganic electrolytes, polymeric stabilizers, biocides, and pH adjusting agents can be included in the polymerization system.

In one embodiment of the disclosed technology, the protective colloid or auxiliary emulsifier is selected from poly(vinyl alcohol) that has a degree of hydrolysis ranging from about 80 to 95% in one aspect, and from about 85 to 90% in another aspect.

In a typical two stage emulsion polymerization, a mixture of the monomers is added to a first reactor under inert atmosphere to a solution of emulsifying surfactant (e.g., anionic surfactant) in water. Optional processing aids can be added as desired (e.g., protective colloids, auxiliary emulsifier(s)). The contents of the reactor are agitated to prepare a monomer emulsion. To a second reactor equipped with an agitator, an inert gas inlet, and feed pumps are added under inert atmosphere a desired amount of water and additional anionic surfactant and optional processing aids. The contents of the second reactor are heated with mixing agitation. After the contents of the second reactor reaches a temperature in the range of about 55 to 98° C., a free radical initiator is injected into the so formed aqueous surfactant solution in the second reactor, and the monomer emulsion from the first reactor is gradually metered into the second reactor over a period typically ranging from about one half to about four hours. The reaction temperature is controlled in the range of about 45 to about 95° C. After completion of the monomer addition, an additional quantity of free radical initiator can optionally be added to the second reactor, and the resulting reaction mixture is typically held at a temperature of about 45 to 95° C. for a time period sufficient to complete the polymerization reaction to obtain the polymer emulsion.

In one aspect, the crosslinked, nonionic, amphiphilic polymers of the disclosed technology are selected from an emulsion polymer polymerized from a monomer mixture comprising from about 20 to about 60 wt. % of at least one $C_1$-$C_4$ hydroxyalkyl (meth)acrylate (e.g., hydroxyethyl methacrylate); from about 10 to about 70 wt. % of at least one $C_1$-$C_{12}$ alkyl (meth)acrylate in one aspect or from about 10 to about 70 wt. % of at least one $C_1$-$C_5$ alkyl (meth) acrylate in another aspect; from about 0, 1, 5 or 15 to about 40 wt. % of at least one vinyl ester of a $C_1$-$C_{10}$ carboxylic acid, from about 0, 1 or 15 to about 30 wt. % of a vinyl lactam (e.g., vinyl pyrrolidone); from about 0, 0.1, 1, 5, or 7 to about 15 wt. % of at least one associative and/or a semi-hydrophobic monomer (wherein all monomer weight percentages are based on the weight of the total monomers); and from about 0.01 to about 5 wt. % in one aspect, from about 0.1 to about 3 in another aspect, and from about 0.5 to about 1 wt. % in a further aspect of at least one crosslinker (based on the dry weight of the polymer), wherein the at least one crosslinker is selected from an amphiphilic crosslinking agent or a combination of an amphiphilic crosslinking agent and a conventional crosslinking agent as defined herein.

In another aspect, the crosslinked, nonionic, amphiphilic polymers of the disclosed technology are selected from an emulsion polymer polymerized from a monomer mixture comprising from about 20 to about 50 wt. % at least one $C_1$-$C_4$ hydroxyalkyl (meth)acrylate (e.g., hydroxyethyl methacrylate); from about 10 to about 30 wt. % ethyl acrylate; from about 10 to about 35 wt. % butyl acrylate; from about 0 or 15 to about 25 wt. % of a vinyl ester of a $C_1$-$C_5$ carboxylic acid selected from vinyl formate, vinyl acetate, vinyl propionate, vinyl butyrate, vinyl isobutyrate, and vinyl valerate; from about 0, 1 or 15 to about 30 wt. % of vinyl pyrrolidone; and from about 0, 0.1, 1, 5 or 7 to about 15 wt. % of at least one associative monomer and/or semi-hydrophobic monomer (wherein all monomer weight percentages are based on the weight of the total monomers); and from about 0.01 to about 5 wt. % in one aspect, from about 0.1 to about 3 in another aspect, and from about 0.5 to about 1 in a further aspect of at least one crosslinker (based on the dry weight of the polymer), wherein the at least one crosslinker is selected from an amphiphilic crosslinking agent or a combination of an amphiphilic crosslinking agent and a conventional crosslinking agent as defined herein.

In another embodiment, the crosslinked, nonionic, amphiphilic polymers of the disclosed technology are selected from an emulsion polymer polymerized from a monomer mixture comprising from about 20 to about 50 wt. % of hydroxyethyl methacrylate; from about 10 to about 30 wt. % ethyl acrylate; from about 10 to about 30 wt. % butyl acrylate; from about 0, 1, or 15 to about 25 wt. % of vinyl pyrrolidone; from about 0 or 15 to about 25 wt. % of vinyl acetate; from about 0, 0.1, 1, 5 or 7 to about 10 wt. % of at least one associative and/or semi-hydrophobic monomer (wherein all monomer weight percentages are based on the weight of the total monomers); and from about 0.01 to about 5 wt. % in one aspect, from about 0.1 to about 3 wt. % in another aspect, and from about 0.5 to about 1 wt. % in a further aspect of at least one crosslinker (based on the dry weight of the polymer), wherein the at least one crosslinker is selected from an amphiphilic crosslinking agent or a combination of an amphiphilic crosslinking agent and a conventional crosslinking agent as defined herein.

In another embodiment, the crosslinked, nonionic, amphiphilic polymers of the disclosed technology are selected from an emulsion polymer polymerized from a monomer mixture comprising from about 20 to about 50 wt. % of hydroxyethyl methacrylate; from about 10 to about 40 wt. % ethyl acrylate; from about 10 to about 20 wt. % butyl acrylate; from about 0.1 to about 10 wt. % of at least one associative and/or semi-hydrophobic monomer (wherein all monomer weight percentages are based on the weight of the total monomers); and from about 0.01 to about 5 wt. % in one aspect, from about 0.1 to about 3 wt. % in another aspect, and from about 0.5 to about 1 wt. % in a further aspect of at least one crosslinker (based on the dry weight of the polymer), wherein the at least one crosslinker is selected from an amphiphilic crosslinking agent or a combination of an amphiphilic crosslinking agent and a conventional crosslinking agent as defined herein.

In one aspect, the crosslinked, nonionic, amphiphilic polymers of the disclosed technology are selected from an emulsion polymer polymerized from a monomer mixture comprising from about 20 to 50 wt. % of hydroxyethyl methacrylate; from about 10 to about 30 wt. % ethyl acrylate; from about 10 to about 30 wt. % butyl acrylate; from about 1 to about 10 wt. % of at least one associative and/or semi-hydrophobic monomer (wherein all monomer weight percentages are based on the weight of the total monomers); and from about 0.01 to about 5 wt. % in one aspect, from about 0.1 to about 3 wt. % in another aspect, and from about 0.5 to about 1 wt. % in a further aspect of at least one crosslinker (based on the dry weight of the polymer), wherein the at least one crosslinker is selected from an amphiphilic crosslinking agent or a combination of an amphiphilic crosslinking agent and a conventional crosslinking agent as defined herein.

In one aspect, the crosslinked, nonionic, amphiphilic polymers of the disclosed technology are selected from an emulsion polymer polymerized from a monomer mixture comprising from about 20 to 35 wt. % of hydroxyethyl methacrylate, from about 10 to about 30 wt. % ethyl acrylate, from about 10 to about 30 wt. % butyl acrylate, from about 15 to about 25 wt. % of vinyl pyrrolidone, from about 15 to about 25 wt. % of vinyl acetate (wherein all monomer weight percentages are based on the weight of the total monomers), and from about 0.01 to about 5 wt. % in one aspect, from about 0.1 to about 3 wt. % in another aspect, and from about 0.5 to about 1 wt. % in a further aspect of at least one crosslinker (based on the dry weight of the polymer), wherein the at least one crosslinker is selected from an amphiphilic crosslinking agent or a combination of an amphiphilic crosslinking agent and a conventional crosslinking agent as defined herein.

In one aspect, the crosslinked, nonionic, amphiphilic polymers of the disclosed technology are selected from an emulsion polymer polymerized from a monomer mixture comprising from about 20 to 40 wt. % of hydroxyethyl methacrylate, from about 10 to about 30 wt. % ethyl acrylate, from about 10 to about 30 wt. % butyl acrylate, from about 15 to about 25 wt. % of vinyl pyrrolidone, and from about 1 to about 5 wt. % of at least one associative and/or semi-hydrophobic monomer (wherein all monomer weight percentages are based on the weight of the total monomers), and from about 0.01 to about 5 wt. % in one aspect, from about 0.1 to about 3 wt. % in another aspect, and from about 0.5 to about 1 wt. % in a further aspect of at least one crosslinker (based on the dry weight of the polymer), wherein the at least one crosslinker is selected from an amphiphilic crosslinking agent or a combination of an amphiphilic crosslinking agent and a conventional crosslinking agent as defined herein.

In one aspect, the crosslinked nonionic, amphiphilic emulsion polymers of the technology are random copolymers and have weight average molecular weights ranging from above about 500,000 to at least about a billion Daltons or more in one aspect, and from about 600,000 to about 4.5 billion Daltons in another aspect, and from about 1,000,000 to about 3,000,000 Daltons in a further aspect, and from about 1,500,000 to about 2,000,000 Daltons in a still further aspect (see TDS-222, Oct. 15, 2007, Lubrizol Advanced Materials, Inc., which is herein incorporated by reference).

Yield Stress Fluids

In one exemplary aspect of the disclosed technology, the yield stress fluid comprises: i) at least one crosslinked, nonionic amphiphilic polymer(s) described previously; ii) at least one surfactant selected from at least one anionic surfactant, at least one cationic surfactant, at least one amphoteric surfactant, at least one nonionic surfactant, and combinations thereof; and iii) water.

In another exemplary aspect of the disclosed technology, the yield stress fluid comprises: i) at least one crosslinked, nonionic amphiphilic polymer(s) described previously; ii) at least one anionic surfactant; and iii) water.

In another exemplary aspect of the disclosed technology, the yield stress fluid comprises: i) at least one crosslinked, nonionic amphiphilic polymer(s) described previously; ii) at least one anionic surfactant and at least one amphoteric surfactant; and iii) water.

Surprisingly, the present amphiphilic polymers can be activated by a surfactant to provide a stable yield stress fluid with desirable rheological and aesthetic properties with the ability to suspend particulate and insoluble materials in an aqueous medium for indefinite periods of time independent of pH. The yield stress value, elastic modulus and optical clarity are substantially independent of pH in the compositions in which they are included. The yield stress fluid of the disclosed technology is useful in the pH range of from about 2 to about 14 in one aspect, from about 3 to 11 in another aspect, and from about 4 to about 9 in a further aspect. Unlike the pH-responsive crosslinked polymers (acid or base sensitive) that require neutralization with an acid or a base to impart a desired rheological profile, the crosslinked, nonionic, amphiphilic polymers of the rheological profiles of the disclosed technology are substantially independent of pH. By substantially independent of pH is meant that the yield stress fluid within which the polymer of the disclosed technology is included imparts a desired rheological profile (e.g., a yield stress of at least 1 mPa, or 0.1 Pa in one aspect, at least at least 0.5 Pa in another aspect, at least 1 Pa in still another aspect, and at least 2 Pa in a further aspect) across a wide pH range (e.g., from about 2 to about 14) wherein the standard deviation in yield stress values across the pH range is less than 1 Pa in one aspect, less than 0.5 Pa in another aspect, and less than 0.25 Pa in a further aspect of the disclosed technology.

In one exemplary aspect of the disclosed technology, the yield stress fluid comprises at least one crosslinked, nonionic, amphiphilic polymer, at least one anionic surfactant, an optional nonionic surfactant, and water.

In another exemplary aspect, the yield stress fluid comprises at least one crosslinked, nonionic amphiphilic polymer, at least one anionic surfactant, at least one amphoteric surfactant, an optional nonionic surfactant, and water.

In still another exemplary aspect, the yield stress fluid comprises at least one crosslinked, nonionic, amphiphilic polymer, at least one anionic ethoxylated surfactant, an optional nonionic surfactant, and water. In one aspect, the average degree of ethoxylation in the anionic surfactant can range from about 1 to about 3. In another aspect, the average degree of ethoxylation is about 2.

In a further exemplary aspect, the yield stress fluid comprises at least one crosslinked, nonionic, amphiphilic polymer, at least one anionic ethoxylated surfactant, at least one amphoteric surfactant, an optional nonionic surfactant, and water. In one aspect, the average degree of ethoxylation in the anionic surfactant can range from about 1 to about 3. In another aspect, the average degree of ethoxylation is about 2.

In a still further exemplary aspect, the yield stress fluid comprises at least one crosslinked, nonionic, amphiphilic polymer, at least one anionic non-ethoxylated surfactant, at least one anionic ethoxylated surfactant, an optional nonionic surfactant, and water. In one aspect, the average degree of ethoxylation in the anionic surfactant can range from about 1 to about 3. In another aspect, the average degree of ethoxylation is about 2.

In another exemplary aspect, the yield stress fluid comprises at least one crosslinked, nonionic, amphiphilic polymer, at least one anionic non-ethoxylated surfactant, at least one anionic ethoxylated surfactant, at least one amphoteric surfactant, an optional nonionic surfactant, and water. In one aspect, the average degree of ethoxylation in the anionic surfactant can range from about 1 to about 3. In another aspect, the average degree of ethoxylation is about 2.

The amount of amphiphilic polymer utilized in formulating the yield stress fluid of the disclosed technology ranges from about 0.5 to about 5 wt. % polymer solids (100% active polymer) based on the weight of the total composition. In another aspect, the amount of amphiphilic polymer utilized in the formulation ranges from about 0.75 wt. % to about 3.5 wt. %. In still another aspect, the amount of amphiphilic polymer employed in the yield stress fluid ranges from about 1 to about 3 wt. %. In a further aspect, the amount of amphiphilic polymer employed in the yield stress fluid ranges from about 1.5 wt. % to about 2.75 wt. %. In a still further aspect, the amount of amphiphilic polymer utilized in the yield stress fluid ranges from about 2 to about 2.5 wt. %. The crosslinked, nonionic, amphiphilic polymer utilized in formulating the yield stress fluids of the disclosed technology is an emulsion polymer.

The yield stress fluids can be prepared by adding an activating surfactant. The activating surfactants utilized to formulate the yield stress fluids of the disclosed technology can be selected from anionic surfactants, cationic surfactants, amphoteric surfactants, nonionic surfactants, and mixtures thereof. The term "activating surfactant" is employed in the context of surfactants employed to activate the amphiphilic polymer to create the yield stress fluid. Some activating surfactants may also be stabilizing surfactants. Various non-limiting examples of activating surfactants are presented below.

Non-limiting examples of anionic surfactants are disclosed in *McCutcheon's Detergents and Emulsifiers*, North American Edition, 1998, published by Allured Publishing Corporation; and McCutcheon's, *Functional Materials*, North American Edition (1992); both of which are incorporated by reference herein in their entirety. The anionic surfactant can be any of the anionic surfactants known or previously used in the art of aqueous surfactant compositions. Suitable anionic surfactants include but are not limited to alkyl sulfates, alkyl ether sulfates, alkyl sulphonates, alkaryl sulfonates, α-olefin-sulphonates, alkylamide sulphonates, alkarylpolyether sulphates, alkylamidoether sulphates, alkyl monoglyceryl ether sulfates, alkyl monoglyceride sulfates, alkyl monoglyceride sulfonates, alkyl succinates, alkyl sulfosuccinates, alkyl sulfosuccinamates, alkyl ether sulphosuccinates, alkyl amidosulfosuccinates; alkyl sulphoacetates, alkyl phosphates, alkyl ether phosphates, alkyl ether carboxylates, alkyl amidoethercarboxylates, N-alkylamino acids, N-acyl amino acids, alkyl peptides, N-acyl taurates, alkyl isethionates, carboxylate salts wherein the acyl group is derived from fatty acids; and the alkali metal, alkaline earth metal, ammonium, amine, and triethanolamine salts thereof.

In one aspect, the cation moiety of the forgoing salts is selected from sodium, potassium, magnesium, ammonium, mono-, di- and triethanolamine salts, and mono-, di-, and tri-isopropylamine salts. The alkyl and acyl groups of the foregoing surfactants contain from about 6 to about 24 carbon atoms in one aspect, from 8 to 22 carbon atoms in another aspect and from about 12 to 18 carbon atoms in a further aspect and can be saturated or unsaturated. The aryl groups in the surfactants are selected from phenyl or benzyl. The ether containing surfactants set forth above can contain from 1 to 10 ethylene oxide and/or propylene oxide units per surfactant molecule in one aspect, and from 1 to 3 ethylene oxide units per surfactant molecule in another aspect.

Examples of suitable anionic surfactants include but are not limited to the sodium, potassium, lithium, magnesium, and ammonium salts of laureth sulfate, trideceth sulfate, myreth sulfate, $C_{12}$-$C_{13}$ pareth sulfate, $C_{12}$-$C_{14}$ pareth sulfate, and $C_{12}$-$C_{15}$ pareth sulfate, ethoxylated with 1, 2, 3, 4 or 5 moles of ethylene oxide; sodium, potassium, lithium, magnesium, ammonium, and triethanolamine lauryl sulfate, coco sulfate, tridecyl sulfate, myrstyl sulfate, cetyl sulfate, cetearyl sulfate, stearyl sulfate, oleyl sulfate, and tallow sulfate, disodium lauryl sulfosuccinate, disodium laureth sulfosuccinate, sodium cocoyl isethionate, sodium $C_{12}$-$C_{14}$ olefin sulfonate, sodium laureth-6 carboxylate, sodium methyl cocoyl taurate, sodium cocoyl glycinate, sodium myristyl sarcocinate, sodium dodecylbenzene sulfonate, sodium cocoyl sarcosinate, sodium cocoyl glutamate, potassium myristoyl glutamate, triethanolamine monolauryl phosphate, and fatty acid soaps, including the sodium, potassium, ammonium, and triethanolamine salts of a saturated and unsaturated fatty acids containing from about 8 to about 22 carbon atoms.

The cationic surfactants can be any of the cationic surfactants known or previously used in the art of aqueous surfactant compositions. Useful cationic surfactants can be one or more of those described, for example, in *McCutcheon's Detergents and Emulsifiers*, North American Edition, 1998, supra, and *Kirk-Othmer, Encyclopedia of Chemical Technology*, 4th Ed., Vol. 23, pp. 478-541, the contents of which are herein incorporated by reference. Suitable classes of cationic surfactants include but are not limited to alkyl amines, alkyl imidazolines, ethoxylated amines, quaternary compounds, and quaternized esters. In addition, alkyl amine oxides can function as a cationic surfactant at a low pH.

Alkylamine surfactants can be salts of primary, secondary and tertiary fatty $C_{12}$-$C_{22}$ alkylamines, substituted or unsubstituted, and substances sometimes referred to as "amidoamines". Non-limiting examples of alkylamines and salts thereof include dimethyl cocamine, dimethyl palmitamine, dioctylamine, dimethyl stearamine, dimethyl soyamine, soyamine, myristyl amine, tridecyl amine, ethyl stearylamine, N-tallowpropane diamine, ethoxylated stearylamine, dihydroxy ethyl stearylamine, arachidylbehenylamine, dimethyl lauramine, stearylamine hydrochloride, soyamine chloride, stearylamine formate, N-tallowpropane diamine dichloride, and amodimethicone.

Non-limiting examples of amidoamines and salts thereof include stearamido propyl dimethyl amine, stearamidopropyl dimethylamine citrate, palmitamidopropyl diethylamine, and cocamidopropyl dimethylamine lactate.

Non-limiting examples of alkyl imidazoline surfactants include alkyl hydroxyethyl imidazoline, such as stearyl hydroxyethyl imidazoline, coco hydroxyethyl imidazoline, ethyl hydroxymethyl oleyl oxazoline, and the like.

Non-limiting examples of ethyoxylated amines include PEG-cocopolyamine, PEG-15 tallow amine, quaternium-52, and the like.

Among the quaternary ammonium compounds useful as cationic surfactants, some correspond to the general formula: $(R^{20}R^{21}R^{22}R^{23}N^+) E^-$, wherein $R^{20}$, $R^{21}$, $R^{22}$, and $R^{23}$ are independently selected from an aliphatic group having from 1 to about 22 carbon atoms, or an aromatic, alkoxy, polyoxyalkylene, alkylamido, hydroxyalkyl, aryl or alkylaryl group having 1 to about 22 carbon atoms in the alkyl chain; and $E^-$ is a salt-forming anion such as those selected from halogen, (e.g., chloride, bromide), acetate, citrate, lactate, glycolate, phosphate, nitrate, sulfate, and alkylsulfate. The aliphatic groups can contain, in addition to carbon and hydrogen atoms, ether linkages, ester linkages, and other groups such as amino groups. The longer chain aliphatic groups, e.g., those of about 12 carbons, or higher, can be saturated or unsaturated. In one aspect, the aryl groups are selected from phenyl and benzyl.

Exemplary quaternary ammonium surfactants include, but are not limited to cetyl trimethylammonium chloride, cetylpyridinium chloride, dicetyl dimethyl ammonium chloride, dihexadecyl dimethyl ammonium chloride, stearyl dimethyl benzyl ammonium chloride, dioctadecyl dimethyl ammonium chloride, dieicosyl dimethyl ammonium chloride, didocosyl dimethyl ammonium chloride, dihexadecyl dimethyl ammonium chloride, dihexadecyl dimethyl ammonium acetate, behenyl trimethyl ammonium chloride, benzalkonium chloride, benzethonium chloride, and di(coconutalkyl) dimethyl ammonium chloride, ditallowdimethyl ammonium chloride, di(hydrogenated tallow) dimethyl ammonium chloride, di(hydrogenated tallow) dimethyl ammonium acetate, ditallowdimethyl ammonium methyl sulfate, ditallow dipropyl ammonium phosphate, and ditallow dimethyl ammonium nitrate.

At low pH, amine oxides can protonate and behave similarly to N-alkyl amines. Examples include, but are not limited to, dimethyl-dodecylamine oxide, oleyldi(2-hydroxyethyl) amine oxide, dimethyltetradecylamine oxide, di(2-hydroxyethyl)-tetradecylamine oxide, dimethylhexadecylamine oxide, behenamine oxide, cocamine oxide, decyltetradecylamine oxide, dihydroxyethyl $C_{12}$-$C_{15}$ alkoxypropylamine oxide, dihydroxyethyl cocamine oxide, dihydroxyethyl lauramine oxide, dihydroxyethyl stearamine oxide, dihydroxyethyl tallowamine oxide, hydrogenated palm kernel amine oxide, hydrogenated tallowamine oxide, hydroxyethyl hydroxypropyl $C_{12}$-$C_{15}$ alkoxypropylamine oxide, lauramine oxide, myristamine oxide, cetylamine oxide, oleamidopropylamine oxide, oleamine oxide, palmitamine oxide, PEG-3 lauramine oxide, dimethyl lauramine oxide, potassium trisphosphonomethylamine oxide, soyamidopropylamine oxide, cocamidopropylamine oxide, stearamine oxide, tallowamine oxide, and mixtures thereof.

The term "amphoteric surfactant" as used herein, is also intended to encompass zwitterionic surfactants, which are well known to formulators skilled in the art as a subset of amphoteric surfactants. Nonlimiting examples of amphoteric surfactants are disclosed *McCutcheon's Detergents and Emulsifiers*, North American Edition, supra, and McCutcheon's, *Functional Materials*, North American Edition, supra; both of which are incorporated by reference herein in their entirety. Suitable examples include but are not limited to amino acids (e.g., N-alkyl amino acids and N-acyl amino acids), betaines, sultaines, and alkyl amphocarboxylates.

Amino acid based surfactants suitable in the practice of the disclosed technology include surfactants represented by the formula:

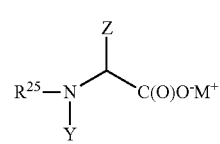

wherein $R^{25}$ represents a saturated or unsaturated hydrocarbon group having 10 to 22 carbon atoms or an acyl group containing a saturated or unsaturated hydrocarbon group having 9 to 22 carbon atoms, Y is hydrogen or methyl, Z is selected from hydrogen, —$CH_3$, —$CH(CH_3)_2$, —$CH_2CH(CH_3)_2$, —$CH(CH_3)CH_2CH_3$, —$CH_2C_6H_5$, —$CH_2C_6H_4OH$, —$CH_2OH$, —$CH(OH)CH_3$, —$(CH_2)_4NH_2$, —$(CH_2)_3NHC(NH)NH_2$, —$CH_2C(O)O^-M^+$, —$(CH_2)_2C(O)O^-M^+$. M is a salt forming cation. In one aspect, $R^{25}$ represents a radical selected from a linear or branched $C_{10}$ to $C_{22}$ alkyl group, a linear or branched $C_{10}$ to $C_{22}$ alkenyl group, an acyl group represented by $R^{26}C(O)$—, wherein $R^{26}$ is selected from a linear or branched $C_9$ to $C_{22}$ alkyl group, a linear or branched $C_9$ to $C_{22}$ alkenyl group. In one aspect, $M^+$ is a cation selected from sodium, potassium, ammonium, and triethanolamine (TEA).

The amino acid surfactants can be derived from the alkylation and acylation of α-amino acids such as, for example, alanine, arginine, aspartic acid, glutamic acid, glycine, isoleucine, leucine, lysine, phenylalanine, serine, tyrosine, and valine. Representative N-acyl amino acid surfactants are, but not limited to the mono- and di-carboxylate salts (e.g., sodium, potassium, ammonium and TEA) of N-acylated glutamic acid, for example, sodium cocoyl glutamate, sodium lauroyl glutamate, sodium myristoyl glutamate, sodium palmitoyl glutamate, sodium stearoyl glutamate, disodium cocoyl glutamate, disodium stearoyl glutamate, potassium cocoyl glutamate, potassium lauroyl glutamate, and potassium myristoyl glutamate; the carboxylate salts (e.g., sodium, potassium, ammonium and TEA) of N-acylated alanine, for example, sodium cocoyl alaninate, and TEA lauroyl alaninate; the carboxylate salts (e.g., sodium, potassium, ammonium and TEA) of N-acylated glycine, for example, sodium cocoyl glycinate, and potassium cocoyl glycinate; the carboxylate salts (e.g., sodium, potassium, ammonium and TEA) of N-acylated sarcosine, for example, sodium lauroyl sarcosinate, sodium cocoyl sarcosinate, sodium myristoyl sarcosinate, sodium oleoyl sarcosinate, and ammonium lauroyl sarcosinate; and mixtures of the foregoing surfactants.

The betaines and sultaines useful in the disclosed technology are selected from alkyl betaines, alkylamino betaines, and alkylamido betaines, as well as the corresponding sulfobetaines (sultaines) represented by the formulas:

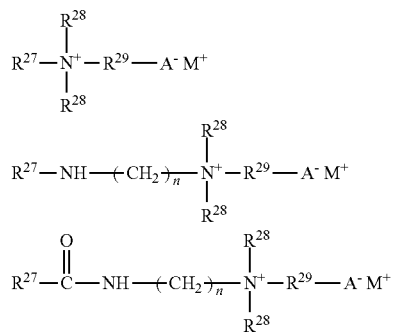

wherein $R^{27}$ is a $C_7$-$C_{22}$ alkyl or alkenyl group, each $R^{28}$ independently is a $C_1$-$C_4$ alkyl group, $R^{29}$ is a $C_1$-$C_5$ alkylene group or a hydroxy substituted $C_1$-$C_5$ alkylene group, n is an integer from 2 to 6, A is a carboxylate or sulfonate group, and M is a salt forming cation. In one aspect, $R^{27}$ is a $C_{11}$-$C_{18}$ alkyl group or a $C_{11}$-$C_{18}$ alkenyl group. In one aspect, $R^{28}$ is methyl. In one aspect, $R^{29}$ is methylene, ethylene or hydroxy propylene. In one aspect, n is 3. In a further aspect, M is selected from sodium, potassium, magnesium, ammonium, and mono-, di- and triethanolamine cations.

Examples of suitable betaines include, but are not limited to, lauryl betaine, coco betaine, oleyl betaine, cocohexadecyl dimethylbetaine, lauryl amidopropyl betaine, cocoamidopropyl betaine (CAPB), and cocamidopropyl hydroxysultaine.

The alkylamphocarboxylates such as the alkylamphoacetates and alkylamphopropionates (mono- and disubstituted carboxylates) can be represented by the formula:

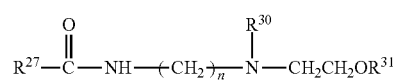

wherein $R^{27}$ is a $C_7$-$C_{22}$ alkyl or alkenyl group, $R^{30}$ is —$CH_2C(O)O^-$ $M^+$, —$CH_2CH_2C(O)O^-$ $M^+$, or —$CH_2CH(OH)CH_2SO_3^-$ $M^+$, $R^{31}$ is hydrogen or —$CH_2C(O)O^-M^+$, and M is a cation selected from sodium, potassium, magnesium, ammonium, and mono-, di- and triethanolamine.

Exemplary alkylamphocarboxylates include, but are not limited to, sodium cocoamphoacetate, sodium lauroamphoacetate, sodium capryloamphoacetate, disodium cocoamphodiacetate, disodium lauroamphodiacetate, disodium caprylamphodiacetate, disodium capryloamphodiacetate, disodium cocoamphodipropionate, disodium lauroamphodipropionate, disodium caprylamphodipropionate, and disodium capryloamphodipropionate.

Non-limiting examples of nonionic surfactants are disclosed in *McCutcheon's Detergents and Emulsifiers*, North American Edition, 1998, supra; and McCutcheon's, *Functional Materials*, North American, supra; both of which are incorporated by reference herein in their entirety. Additional Examples of nonionic surfactants are described in U.S. Pat. No. 4,285,841, to Barrat et al., and U.S. Pat. No. 4,284,532, to Leikhim et al., both of which are incorporated by reference herein in their entirety. Nonionic surfactants typically have a hydrophobic portion, such as a long chain alkyl group or an alkylated aryl group, and a hydrophilic portion containing various degrees of ethoxylation and/or propoxylation (e.g., 1 to about 50) ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty acids, condensation products of ethylene oxide with long chain amines or amides, condensation products of ethylene oxide with alcohols, and mixtures thereof.

Suitable nonionic surfactants include, for example, alkyl polysaccharides, alcohol ethoxylates, block copolymers, castor oil ethoxylates, ceto/oleyl alcohol ethoxylates, cetearyl alcohol ethoxylates, decyl alcohol ethoxylates, dinonyl phenol ethoxylates, dodecyl phenol ethoxylates, end-capped ethoxylates, ether amine derivatives, ethoxylated alkanolamides, ethylene glycol esters, fatty acid alkanolamides, fatty alcohol alkoxylates, lauryl alcohol ethoxylates, monobranched alcohol ethoxylates, nonyl phenol ethoxylates, octyl phenol ethoxylates, oleyl amine ethoxylates, random copolymer alkoxylates, sorbitan ester ethoxylates, stearic acid ethoxylates, stearyl amine ethoxylates, tallow oil fatty acid ethoxylates, tallow amine ethoxylates, tridecanol ethoxylates, acetylenic diols, polyoxyethylene sorbitols, and mixtures thereof. Various specific examples of suitable nonionic surfactants include, but are not limited to, methyl gluceth-10, PEG-20 methyl glucose distearate, PEG-20 methyl glucose sesquistearate, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, or ethoxylated fatty ($C_6$-$C_{22}$) alcohol, including 3 to 20 ethylene oxide moieties, polyoxyethylene-20 isohexadecyl ether, polyoxyethylene-23 glycerol laurate, polyoxyethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxyethylene-6 tridecyl ether, laureth-2, laureth-3, laureth-4, PEG-3 castor oil, PEG 600 dioleate, PEG 400 dioleate, poloxamers such as poloxamer 188, polysorbate 21, polysorbate 40, polysorbate 60, polysorbate 61, polysorbate 65, polysorbate 80, polysorbate 81, polysorbate 85, sorbitan caprylate, sorbitan cocoate, sorbitan diisostearate, sorbitan dioleate, sorbitan distearate, sorbitan fatty acid ester, sorbitan isostearate, sorbitan laurate, sorbitan oleate, sorbitan palmitate, sorbitan sesquiisostearate, sorbitan sesquioleate, sorbitan sesquistearate, sorbitan stearate, sorbitan triisostearate, sorbitan trioleate, sorbitan tristearate, sorbitan undecylenate, or mixtures thereof.

Alkyl glycoside nonionic surfactants can also be employed and are generally prepared by reacting a monosaccharide, or a compound hydrolyzable to a monosaccharide, with an alcohol such as a fatty alcohol in an acid medium. For example, U.S. Pat. Nos. 5,527,892 and 5,770,543 describe alkyl glycosides and/or methods for their preparation. Suitable examples are commercially available under the names of Glucopon™ 220, 225, 425, 600 and 625, PLANTACARE®, and PLANTAPON®, all of which are available from Cognis Corporation of Ambler, Pa.

In another aspect, nonionic surfactants include, but are not limited to, alkoxylated methyl glucosides such as, for example, methyl gluceth-10, methyl gluceth-20, PPG-10 methyl glucose ether, and PPG-20 methyl glucose ether, available from Lubrizol Advanced Materials, Inc., under the trade names, Glucam® E10, Glucam® E20, Glucam® P10, and Glucam® P20, respectively; and hydrophobically modified alkoxylated methyl glucosides, such as PEG 120 methyl glucose dioleate, PEG-120 methyl glucose trioleate, and PEG-20 methyl glucose sesquistearate, available from Lubrizol Advanced Materials, Inc., under the trade names, Glucamate® DOE-120, Glucamate™ LT, and Glucamate™ SSE-20, respectively, are also suitable. Other exemplary hydrophobically modified alkoxylated methyl glucosides are disclosed in U.S. Pat. Nos. 6,573,375 and 6,727,357, the disclosures of which are hereby incorporated by reference in their entirety.

Other useful nonionic surfactants include water soluble silicones such as PEG-10 Dimethicone, PEG-12 Dimethicone, PEG-14 Dimethicone, PEG-17 Dimethicone, PPG-12 Dimethicone, PPG-17 Dimethicone and derivatized/functionalized forms thereof such as Bis-PEG/PPG-20/20 Dimethicone Bis-PEG/PPG-16/16 PEG/PPG-16/16 Dimethicone, PEG/PPG-14/4 Dimethicone, PEG/PPG-20/20 Dimethicone, PEG/PPG-20/23 Dimethicone, and Perfluorononylethyl Carboxydecyl PEG-10 Dimethicone.

The amount of the at least one surfactant (active weight basis) utilized in formulating the yield stress fluid of the disclosed technology ranges from about 1 to about 70 wt. % based on the weight of the total yield stress fluid composition. In another aspect, the amount of the at least one surfactant utilized in the formulation ranges from about 2 to about 50 wt. % or from about 3 to about 25 wt. %. In still another aspect, the amount of the at least one surfactant employed in the yield stress fluid ranges from about 5 to about 22 wt. %. In a further aspect, the amount of the at least one surfactant utilized ranges from about 6 to about 20 wt. %. In still a further aspect, the amount of at least one surfactant is about 10, 12, 14, 16, and 18 wt. % based on the total weight yield of the stress fluid.

In one embodiment of the disclosed technology, the weight ratio (based on active material) of anionic surfactant (non-ethoxylated and/or ethoxylated) to amphoteric surfactant can range from about 10:1 to about 2:1 in one aspect, and can be 9:1, 8:1, 7:1 6:1, 5:1, 4.5:1, 4:1, or 3:1 in another aspect. When employing an ethoxylated anionic surfactant in combination with a non-ethoxylated anionic surfactant and an amphoteric surfactant, the weight ratio (based on active material) of ethoxylated anionic surfactant to non-ethoxylated anionic surfactant to amphoteric surfactant can range from about 3.5:3.5:1 in one aspect to about 1:1:1 in another aspect.

In one embodiment, the yield stress value of the fluid is at least about 1 mPa, or 0.1 Pa in one aspect, about 0.5 Pa in one aspect, at least about 1 Pa in another aspect and at least about 1.5 Pa in a further aspect. In another embodiment, the yield stress of the fluid ranges from about 0.1 to about 20 Pa in one aspect, from about 0.5 Pa to about 10 Pa in another aspect, from about 1 to about 3 Pa in a further aspect, and from about 1.5 to about 3.5 in a still further aspect.

Optionally, the yield stress fluids of the disclosed technology can contain an electrolyte. Suitable electrolytes are known compounds and include salts of multivalent anions, such as potassium pyrophosphate, potassium tripolyphosphate, and sodium or potassium citrate, salts of multivalent cations, including alkaline earth metal salts such as calcium chloride and calcium bromide, as well as zinc halides, barium chloride and calcium nitrate, salts of monovalent cations with monovalent anions, including alkali metal or ammonium halides, such as potassium chloride, sodium chloride, potassium iodide, sodium bromide, and ammonium bromide, alkali metal or ammonium nitrates, and blends thereof. The amount of the electrolyte used will generally depend on the amount of the amphiphilic polymer incorporated, but may be used at concentration levels of from about 0.1 to about 4 wt. % in one aspect and from about 0.2 to about 2 wt. % in another aspect, based on the weight of the total composition.

The yield stress fluid must be easily pourable with a shear thinning index of less than 0.5 at shear rates between 0.1 and 1 reciprocal second. The yield stress fluid can have an optical transmission of at least 10%. In addition, or alternatively, the yield stress fluid can have a nephelometric turbidity unit (NTU) value of 50 or less, or 40 or less, or even 30 or 20 or less. The yield stress fluid of the disclosed technology can be utilized in combination with a rheology modifier (thickener) to enhance the yield value of a thickened liquid. In one aspect, the yield stress fluid of the disclosed technology can be combined with a nonionic rheology modifier which rheology modifier when utilized alone does not have a sufficient yield stress value. Any rheology modifier is suitable, so long as such is soluble in water, stable and contains no ionic or ionizable groups. Suitable rheology modifiers include, but are not limited to natural gums (e.g., polygalactomannan gums selected from fenugreek, cassia, locust bean, tara and guar), modified cellulose (e.g., ethylhexylethylcellulose (EHEC), hydroxybutylmethylcellulose (HBMC), hydroxyethylmethylcellulose (HEMC), hydroxypropylmethylcellulose (HPMC), methyl cellulose (MC), hydroxyethylcellulose (HEC), hydroxypropylcellulose (HPC) and cetyl hydroxyethylcellulose); and mixtures thereof methylcellulose, polyethylene glycols (e.g., PEG 4000, PEG 6000, PEG 8000, PEG 10000, PEG 20000), polyvinyl alcohol, polyacrylamides (homopolymers and copolymers), and hydrophobically modified ethoxylated urethanes (HEUR). The rheology modifier can be utilized in an amount ranging from about 0.5 to about 25 wt. % in one aspect, from about 1 to about 15 wt. % in another aspect, and from about 2 to about 10 wt. % in a further aspect, based on the weight of the total weight of the composition.

The yield stress fluids of the disclosed technology can be used in any application requiring yield stress properties. The yield stress fluids can be used alone or in combination with other fluids to enhance the yield stress values thereof.

In one embodiment, the yield stress fluids of the disclosed technology can be utilized to suspend particulate materials and insoluble droplets within an aqueous composition. Such fluids are useful in the oil and gas, personal care, and homecare industries.

In the oil and gas industry, the yield stress fluids of the disclosed technology can be used to enhance the yield stress value of drilling and hydraulic fracturing fluids, and can be employed to suspend borehole cuttings and fracturing proppants such as, for example, sand, sintered bauxite, glass balls, ceramic materials, polystyrene beads, and the like.

In the personal care industry, the yield stress fluids of the disclosed technology can be utilized to improve the yield stress properties of detersive compositions, hair and skin care compositions, as well as cosmetics, and can be utilized to suspend insoluble silicones, opacifiers and pearlescent agents (e.g., mica, coated mica), pigments, exfoliants, antidandruff agents, clay, swellable clay, laponite, gas bubbles, liposomes, microsponges, cosmetic beads, cosmetic microcapsules, and flakes. The yield stress fluids of the disclosed technology can stabilize these materials in suspension for at least one month at 23° C. in one aspect, at least 6 months in another aspect, and at least one year in a further aspect.

The stable compositions maintain a smooth, acceptable rheology with good shear thinning properties without significant increases or decreases in viscosity, with no phase separation, e.g., settling or creaming out (rising to the surface), or loss of clarity over extended periods of time, such as for at least one month at 45° C.

Exemplary bead components include, but are not limited to, agar beads, alginate beads, jojoba beads, gelatin beads, Styrofoam™ beads, polyacrylate, polymethylmethacrylate (PMMA), polyethylene beads, Unispheres™ and Unipearls™ cosmetic beads (Induchem USA, Inc., New York, N.Y.), Lipocapsule™, Liposphere™, and Lipopearl™ microcapsules (Lipo Technologies Inc., Vandalia, Ohio), and Confetti II™ dermal delivery flakes (United-Guardian, Inc., Hauppauge, N.Y.). Beads can be utilized as aesthetic materials or can be used to encapsulate benefit agents to protect them from the deteriorating effects of the environment or for optimal delivery, release and performance in the final product.

In one aspect, the cosmetic beads range in size from about 0.5 to about 1.5 mm. In another aspect, the difference in specific gravity of the bead and water is between about +/−0.01 and 0.5 in one aspect and from about +/−0.2 to 0.3 g/ml in another aspect.

In one aspect, the microcapsules range in size from about 0.5 to about 300 μm. In another aspect, the difference in specific gravity between the microcapsules and water is from about +/−0.01 to 0.5. Non-limiting examples of microcapsule beads are disclosed in U.S. Pat. No. 7,786,027, the disclosure of which is herein incorporated by reference.

In one aspect of the disclosed technology, the amount of particulate component and/or insoluble droplets can range from about 0.1% to about 10% by weight based on the total weight of the composition.

While overlapping weight ranges for the various components and ingredients that can be contained in the yield stress fluids of the disclosed technology have been expressed for selected embodiments and aspects of the disclosed technology, it should be readily apparent that the specific amount of each component in the compositions will be selected from its disclosed range such that the amount of each component is adjusted so that the sum of all components in the composition will total 100 weight percent. The amounts employed will vary with the purpose and character of the desired product and can be readily determined by one skilled in the formulation art and from the literature.

The disclosed technology is illustrated by the following examples that are merely for the purpose of illustration and are not to be regarded as limiting the scope of the disclosed technology or the manner in which it can be practiced. Unless specifically indicated otherwise, parts and percentages are given by weight.

The following abbreviations and trade names are utilized in the examples.

Abbreviations

| | |
|---|---|
| AA | Acrylic Acid |
| AMD | Acrylamide |
| AOS | Sodium alpha olefin sulfonate from Stepan Company |
| APE | Allyl Pentaerythritol |
| BEM | Sipomer ® Ethoxylated (25) Behenyl Methacrylate, Rhodia |
| CAPB | cocoamidopropyl betaine |
| CSEM | Cetearyl Polyethoxylated (25 moles) methacrylate (75% active), Bimax Chemicals LTD |
| DI Water | Deionized Water |
| EA | Ethyl Acrylate |
| E-Sperse RS-1596 | Reactive surfactant with one reactive group from Ethox Chemical, LLC |
| E-Sperse RS-1616 | Reactive surfactant with one reactive group from Ethox Chemical, LLC |
| E-Sperse RS-1617 | Reactive surfactant with two reactive group from Ethox Chemical, LLC |
| E-Sperse RS-1618 | Reactive surfactant with two reactive group from Ethox Chemical, LLC |
| E-Sperse RS-1684 | Reactive surfactant with two reactive group from Ethox Chemical, LLC |
| HEMA | 2-Hydroxyethyl Methacrylate |
| MAMD | Methacrylamide |
| n-BA | n-Butyl Acrylate |
| n-VP | n-Vinyl Pyrrolidone |
| Polystep TSP-165 | Surfactant without reactive group from Stepan |
| Selvol ® 502 and 205 | Polyvinyl Alcohol (hydrolysis % = 87-89%), Sekisui Corporation |
| SLES2 | Sodium Lauryl Ether Sulfate |
| TBHP | tert-butyl t-butyl hydroperoxide (70%), Alfa Aesar |
| VA-086 | Azo VA-086 2,2'-Azobis[2-methyl-N-(2-hydroxyethyl)propionamide] Wako |
| VAc | Vinyl Acetate |

The following examples illustrate the technology disclosed herein.

Example 1 (Comparative)

Monomer Composition=EA/n-BA/HEMA/BEM (35/15/45/5) wt.

An emulsion polymer was prepared as follows. A monomer premix was made by mixing 140 grams of DI water, 12.5 grams of 40% sodium alpha olefin sulfonate (AOS) aqueous solution, 175 grams of (EA), 75 grams of (n-BA), 225 grams of (HEMA) and 33.3 grams of (BEM). Initiator A was made by mixing 3.57 grams of 70% t-butyl hydrogen peroxide (TBHP) in 40 grams of DI water. Reductant A was prepared by dissolving 0.13 grams of erythorbic acid in 5 grams of DI water. Reductant B was prepared by dissolving 2.5 grams of erythorbic acid in 100 grams of DI water. A 3-liter reactor was charged with 825 grams of DI water, 7.5 grams of 40% AOS and 15 grams of Selvol 502 from Sekisui, and then was heated to 70° C. under a nitrogen blanket with proper agitation. After holding the reactor at 70° C. for one hour, the reactor was cooled down to 65° C., and then initiator A was then added to the reactor followed by addition of reductant A. After about 1 minute, the monomer premix was proportioned to the reaction vessel over a period of 180 minutes. About 3 minutes after the start of monomer premix proportioning, reductant B was proportioned to the reactor over a period of 210 minutes. After completion of the reductant B feed, the temperature of the reaction vessel was maintained at 65° C. for 60 minutes. The reactor was then cooled to 60° C. A solution of 1.96 grams of 70% TBHP and 0.13 grams of 40% AOS in 15 grams of DI water was added to the reactor. After 5 minutes, a solution of 1.27 grams of erythorbic acid in 15 grams of DI water was added to the reactor. The reactor was maintained at 60° C. After 30 minutes, a solution of 1.96 grams of 70% TBHP and 0.13 grams of 40% AOS in 15 grams of DI water was added to the reactor. After 5 minutes, a solution of 1.27 grams of erythorbic acid in 15 grams of DI water was added to the reactor. The reactor was maintained at 60° C. for about 30 minutes. Then, the reactor was cooled to the room temperature and filtered through 100-micron cloth. The pH of the resulting emulsion was adjusted to 4-5 with ammonium hydroxide. The polymer product had a solids content of 29%, viscosity of 14 cps, and particle size of 111 nm.

Example 2 (Comparative)

Monomer Composition=EA/n-BA/HEMA/BEM/APE (35/14.91/45/5/0.088) wt.

An emulsion polymer was prepared as follows. A monomer premix was made by mixing 140 grams of DI water, 3.75 grams of 40% sodium alpha olefin sulfonate (AOS) aqueous solution, 175 grams of (EA), 70.6 grams of (n-BA), 225 grams of (HEMA) and 33.3 grams of (BEM). Initiator A was made by mixing 3.57 grams of 70% t-butyl hydrogen peroxide (TBHP) in 40 grams of DI water. Reductant A was prepared by dissolving 0.13 grams of erythorbic acid in 5 grams of DI water. Reductant B was prepared by dissolving 2.5 grams of erythorbic acid in 100 grams of DI water. A 3-liter reactor was charged with 800 grams of DI water, 10 grams of 40% AOS and 25 grams of Selvol 502 from Sekisui, and then was heated to 70° C. under a nitrogen blanket with proper agitation. After holding the reactor at 70° C. for one hour, initiator A was added to the reactor and followed by addition of a reductant A. After about 1 minute, the monomer premix was proportioned to the reaction vessel over a period of 180 minutes. About 3 minutes after the start of monomer premix proportioning, reductant B was proportioned to the reactor over a period of 210 minutes. The reaction temperature was kept at 65° C. At about 115 minutes after the monomer premix proportioning, the premix proportioning was stopped for 10 minutes, and then 0.44 grams of 70% APE in 3.94 grams of n-BA was added to the monomer premix. After the 10 minute period, the premix proportioning was re-started. After completion of reductant B feed, the temperature of the reaction vessel was maintained at 65° C. for 60 minutes. The reactor was then cooled to 60° C. A solution of 1.96 grams of 70% TBHP and 0.13 grams of 40% AOS in 15 grams of DI water was added to the reactor. After 5 minutes, a solution of 1.27 grams of erythorbic acid in 15 grams of DI water was added to the reactor. The reactor was maintained at 60° C. After 30 minutes, a solution of 1.96 grams of 70% TBHP and 0.13 grams of 40% AOS in 15 grams of DI water was added to the reactor. After 5 minutes, a solution of 1.27 grams of erythorbic acid in 15 grams of DI water was added to the reactor. The reactor was maintained at 60° C. for about 30 minutes. Then, the reactor was cooled to room temperature and filtered through 100-micron cloth. The pH of the resulting emulsion was adjusted to 4-5 with ammonium hydroxide. The polymer product had a solids content of 31.5%, a viscosity of 20 cps, and a particle size of 145 nm.

Example 3 (Illustrative)

Monomer Composition=EA/n-BA/HEMA/BEM (35/15/45/5) wt.

An emulsion polymer was prepared as follows. A monomer premix was made by mixing 140 grams of DI water, 5 grams of reactive surfactant E-Sperse RS-1618, 175 grams of (EA), 75 grams of (n-BA), 225 grams of (HEMA) and 33.3 grams of (BEM). Initiator A was made by mixing 2.86 grams of 70% TBHP in 40 grams of DI water. Reductant A was prepared by dissolving 0.13 grams of erythorbic acid in 5 grams of DI water. Reductant B was prepared by dissolving 2.0 grams of erythorbic acid in 100 grams of DI water. A 3-liter reactor was charged with 800 grams of DI water, 10 grams of 40% AOS and 25 grams of Selvol 502 from Sekisui. The contents of the reactor was heated to 70° C. under a nitrogen blanket with proper agitation. After holding the reactor at 70° C. for one hour, initiator A was added to the reactor and followed by addition of reductant A. After about 1 minute, the monomer premix was proportioned to the reaction vesselover a period of 180 minutes. About 3 minutes after the start of monomer premix proportioning, reductant B was proportioned to the reactor over a period of 210 minutes. The reaction temperature was kept at 65° C. After completion of reductant B feed, the temperature of the reaction vessel was maintained at 65° C. for 60 minutes. The reactor was then cooled to 60° C. A solution of 1.79 grams of 70% TBHP and 0.13 grams of 40% AOS in 15 grams of DI water was added to the reactor. After 5 minutes, a solution of 1.05 grams of erythorbic acid in 15 grams of DI water was added to the reactor. The reactor was maintained at 60° C. After 30 minutes, a solution of 1.79 grams of 70% TBHP and 0.13 grams of 40% AOS in 15 grams of DI water was added to the reactor. After 5 minutes, a solution of 1.05 grams of erythorbic acid in 15 grams of DI water was added to the reactor. The reactor was maintained at 60° C. for about 30 minutes. Then, the reactor was cooled to room temperature and filtered through 100-micron cloth. The pH of the resulting emulsion was adjusted to 4-5 with ammonium hydroxide. The polymer product had a solids content of 30.4%, a viscosity of 21 cps, and a particle size of 119 nm.

Example 4 (Illustrative)

Monomer Composition=EA/n-BA/HEMA/BEM (35/15/45/5) wt.

An emulsion polymer was prepared same as Comparative Example 1 except 12.5 grams of 40% sodium alpha olefin sulfonate (AOS) aqueous solution in the monomer mix was replaced by 5 grams of reactive surfactant E-Sperse RS-1618. The polymer product had a solids content of 30.85%, a viscosity of 19 cps, and a particle size of 99 nm.

Example 5 (Illustrative)

Monomer Composition=EA/n-BA/HEMA/BEM/APE (35/14.91/45/5/0.088) wt.

An emulsion polymer was prepared same as Comparative Example 2 except 3.75 grams of 40% sodium alpha olefin sulfonate (AOS) aqueous solution in the monomer mix was replaced by 5 grams of reactive surfactant E-Sperse RS-1618. The polymer product had a solids content of 30.8%, a viscosity of 24 cps and a particle size of 110 nm.

Example 6 (Comparative)

Monomer Composition=EA/n-BA/HEMA/BEM (35/15/45/5) wt.

An emulsion polymer was prepared as follows. A monomer premix was made by mixing 140 grams of DI water, 16.67 grams of 30% Polystep TSP-16S (from Stepan) aqueous solution, 175 grams of ethyl acrylate (EA), 75 grams of n-butyl acrylate (n-BA), 225 grams of 2-hydroxyl ethyl acrylate (HEMA) and 33.3 grams of Sipomer BEM (BEM). Initiator A was made by dissolving 5 grams of 2,2'-Azobis[2-methyl-N-(2-hydroxyethyl)propionamide] (Azo VA-086 from Wako) in 40 grams of DI water. Initiator B was prepared by dissolving 2.5 grams of Azo VA-086 in 100 grams of DI water. A 3-liter reactor was charged with 800 grams of DI water, 5 grams of 40% AOS and 10 grams of Selvol 203 from Sekisui. The contents of the reactor was heated to 87° C. under a nitrogen blanket with proper agitation. After holding the reactor at 87° C. for one hour, initiator A was added to the reactor. After about 1 minute, the monomer premix was proportioned to the reaction vessel over a period of 120 minutes. About 3 minutes after the start of monomer premix proportioning, Initiator B was proportioned to the reactor over a period of 150 minutes. The reaction temperature was maintained at 87° C. After completion of the initiator B feed, the temperature of the reaction vessel was maintained at 87° C. for 60 minutes. The reactor was then cooled to 49° C. A solution of 0.61 grams of 70% TBHP and 0.29 grams of 40% AOS in 15 grams of DI water was added to the reactor. After 5 minutes, a solution of 0.59 grams of erythorbic acid in 15 grams of DI water was added to the reactor. The reactor was maintained at 49° C. After 30 minutes, a solution of 0.69 grams of 70% TBHP and 0.29 grams of 40% AOS in 15 grams of DI water was added to the reactor. After 5 minutes, a solution of 0.59 grams of erythorbic acid in 15 grams of DI water was added to the reactor. The reactor was maintained at 49° C. for about 30 minutes. The reactor was cooled to the room temperature and filtered through 100-micron cloth. The pH of the resulting emulsion was adjusted to 4-5 with ammonium hydroxide. The polymer had a solids content of 29.8%, a viscosity of 18 cps, and a particle size of 84 nm.

Example 7 (Comparative)

Monomer Composition=EA/n-BA/HEMA/BEM (35/15/45/5) wt.

An emulsion polymer was prepared same as Comparative Example 6 except 16.67 grams of 30% Polystep TSP-16S aqueous solution in the monomer mix was replaced by 5.56 grams of 90% E-Sperse RS-1596. The polymer product had a solids content of 30.7%, a viscosity of 28 cps and a particle size of 87 nm.

Example 8 (Comparative)

Monomer Composition=EA/n-BA/HEMA/BEM (35/15/45/5) wt.

An emulsion polymer was prepared same as Comparative Example 6 except 16.67 grams of 30% Polystep TSP-16S aqueous solution in the monomer mix was replaced by 16.67 grams of 30% E-Sperse RS-1616. The polymer product had a solids content of 31.7%, a viscosity of 14 cps and a particle size of 107 nm.

Example 9 (Illustrative)

Monomer Composition=EA/n-BA/HEMA/BEM (35/15/45/5) wt.

An emulsion polymer was prepared same as Comparative Example 6 except 16.67 grams of 30% Polystep TSP-16S aqueous solution in the monomer mix was replaced by 5 grams of 100% E-Sperse RS-1617. The polymer product had a solids content of 31.4%, a viscosity of 14 cps and a particle size of 105 nm.

Example 10 (Illustrative)

Monomer Composition=EA/n-BA/HEMA/BEM (35/15/45/5) wt.

An emulsion polymer was prepared same as Comparative Example 6 except 16.67 grams of 30% Polystep TSP-16S aqueous solution in the monomer mix was replaced by 10 grams of 50% E-Sperse RS-1684 aqueous solution. The polymer product had a solids content of 30%, a viscosity of 29 cps and a particle size of 93 nm.

Example 11 (Illustrative)

Monomer Composition=30/20/45/5 (30/20/45/5) wt.

An emulsion polymer was prepared same as Comparative Example 6 except 16.67 grams of 30% Polystep TSP-16S aqueous solution in the monomer mix was replaced by 5 grams of 100% E-Sperse RS-1618 and monomer compositions were changed to 30 EA/20 n-BA/45 HEMA/5 BEM instead of 35 EA/15 n-BA/45 HEMA/N5 BEM. The polymer product had a solids content of 30.8%, a viscosity of 26 cps and a particle size of 83 nm.

Example 12 (Illustrative)

Monomer Composition=EA/n-BA/HEMA/BEM (25/25/45/5) wt.

An emulsion polymer was prepared same as Comparative Example 6 except 16.67 grams of 30% Polystep TSP-16S aqueous solution in the monomer mix was replaced by 5 grams of 100% E-Sperse RS-1618 and monomer compositions were changed to 25 EA/25 n-BA/45 HEMA/5 BEM instead of 35 EA/15 n-BA/45 HEMA/N5 BEM. The polymer product had a solids content of 30.9%, a viscosity of 39 cps and a particle size of 78 nm.

Example 13 (Illustrative)

Monomer Composition=EA/n-BA/HEMA/BEM (35/20/40/5) wt.

An emulsion polymer was prepared same as Comparative Example 6 except 16.67 grams of 30% Polystep TSP-16S aqueous solution in the monomer mix was replaced by 5 grams of 100% E-Sperse RS-1618 and monomer compositions were changed to 35 EA/20n-BA/40 HEMA/5 BEM instead of 35 EA/15 n-BA/45 HEMA/N5 BEM. The polymer product had a solids content of 31.4%, a viscosity of 42 cps and a particle size of 87 nm.

Example 14 (Illustrative)

Monomer Composition=EA/n-BA/BEM/HEMA/AA (35/15/5/43/2) wt.

An emulsion polymer was prepared as follows. A monomer premix was made by mixing 70 grams of DI water, 2.5 grams of E-Sperse RS-1618, 87.5 grams of ethyl acrylate (EA), 37.5 grams of n-butyl acrylate (n-BA), 16.67 grams of behenyl ethoxylated methacrylate (Sipomer BEM), 107.5 grams of 2-hydroxyl ethyl methacrylate (HEMA), and 5 grams acrylic acid (AA). Initiator #1 was made by dispersing 2.5 grams of VA-086 in 20 grams of DI water. Initiator #2 was prepared by dissolving 1.25 grams of VA-086 in 50 grams of DI water. A 1-liter reactor vessel was charged with 400 grams of DI water, 2.5 grams of 40% AOS and 5 grams of Selvol 203, and then heated to 87° C. under a nitrogen blanket and proper agitation. First, initiator #1 was added to the reaction vessel. The monomer premix was then proportioned to the reaction vessel over a period of 120 minutes; while at the same time, initiator #2 was proportioned to the reaction vessel over a period of 150 minutes. After the completion of monomer premix feed, 16.5 grams of DI water was added to the dropping funnel which held the monomer premix to flush out the residual monomers into the reaction mixture. After the completion of initiator #2 feed, the temperature of the reaction vessel was maintained at 87° C. for 60 minutes. The reaction vessel was then cooled to 49° C. A solution of 0.3 grams of 70% TBHP and 0.14 grams of 40% AOS in 7.5 grams of DI water was added to the reaction vessel. After 5 minutes, a solution of 0.3 grams of erythorbic acid in 7.5 grams of DI water was added to the reaction vessel. After 30 minutes, another solution of 0.3 grams of 70% TBHP and 0.14 grams of 40% AOS in 7.5 grams of DI water was added to the reaction vessel. A solution of 0.3 grams of erythorbic acid in 7.5 grams of DI water was then added to the reaction vessel after 5 minutes. The reaction vessel was maintained at 60° C. for another 30 minutes. The reaction vessel was cooled to room temperature and filtered through a 100-micron cloth. The pH of the resulting emulsion was adjusted to 3.5-4.5 with 28% ammonium hydroxide. The resulting polymer latex had a solid level of 30.7%, and a particle size of 113 nm.

Example 15 (Illustrative)

Monomer Composition=EA/n-BA/BEM/HEMA/AMD (35/15/5/43/2) wt.

An emulsion polymer was prepared as follows. A monomer premix was made by mixing 70 grams of DI water, 2.5 grams of E-Sperse RS-1618, 87.5 grams of ethyl acrylate (EA), 37.5 grams of n-butyl acrylate (n-BA), 16.67 grams of behenyl ethoxylated methacrylate (Sipomer BEM), 107.5 grams of 2-hydroxyl ethyl methacrylate (HEMA), and 10 grams 50% acrylamide (AMD). Initiator #1 was made by dispersing 2.5 grams of VA-086 in 20 grams of DI water. Initiator #2 was prepared by dissolving 1.25 grams of VA-086 in 50 grams of DI water. A 1-liter reactor vessel was charged with 400 grams of DI water, 2.5 grams of 40% AOS and 5 grams of Selvol 203. The contents of the vessel was heated to 87° C. under a nitrogen blanket and proper agitation. First, initiator #1 was added to the reaction vessel. The monomer premix was then proportioned to the reaction vessel over a period of 120 minutes; while at the same time, initiator #2 was proportioned to the reaction vessel over a period of 150 minutes. After the completion of monomer premix feed, 16.5 grams of DI water was added to the dropping funnel which held the monomer premix to flush out the residual monomers. After the completion of initiator #2 feed, the temperature of the reaction vessel was maintained at 87° C. for 60 minutes. The reaction vessel was then cooled to 49° C. A solution of 0.3 grams of 70% TBHP and 0.14 grams of 40% AOS in 7.5 grams of DI water was added to the reaction vessel. After 5 minutes, a solution of 0.3 grams of erythorbic acid in 7.5 grams of DI water was added to the reaction vessel. After 30 minutes, another solution of 0.3 grams of 70% TBHP and 0.14 grams of 40% AOS in 7.5 grams of DI water was added to the reaction vessel. A solution of 0.3 grams of erythorbic acid in 7.5 grams of DI water was then added to the reaction vessel after 5 minutes. The reaction vessel was maintained at 60° C. for another 30 minutes. Then, the reaction vessel was cooled to room temperature and filtered through a 100-micron cloth. The pH of the resulting emulsion was adjusted to 3.5-4.5 with 28% ammonium hydroxide. The resulting polymer latex had a solid level of 30.4%, and a particle size of 90.4 nm.

Example 16 (Illustrative)

Monomer Composition=EA/n-BA/BEM/HEMA/MAMD (35/15/5/43/2) wt.

An emulsion polymer was prepared as follows. A monomer premix was made by mixing 70 grams of DI water, 2.5 grams of E-Sperse-1618, 87.5 grams of ethyl acrylate (EA), 37.5 grams of n-butyl acrylate (n-BA), 16.67 grams of (BEM), 107.5 grams of (HEMA), and 20 grams 25% methacrylamide (MAMD). Initiator #1 was made by dispersing 2.5 grams of VA-086 in 20 grams of DI water. Initiator #2 was prepared by dissolving 1.25 grams of VA-086 in 50 grams of DI water. A 1-liter reactor vessel was charged with 400 grams of DI water, 2.5 grams of 40% AOS and 5 grams of Selvol 203, and then heated to 87° C. under a nitrogen blanket and proper agitation. First, initiator #1 was added to the reaction vessel. The monomer premix was then proportioned to the reaction vessel over a period of 120 minutes; while at the same time, initiator #2 was proportioned to the reaction vessel over a period of 150 minutes. After the completion of monomer premix feed, 16.5 grams of DI water was added to the dropping funnel which held the monomer premix to flush out the residual monomers. After the completion of initiator #2 feed, the temperature of the reaction vessel was maintained at 87° C. for 60 minutes. The reaction vessel was then cooled to 49° C. A solution of 0.3 grams of 70% TBHP and 0.14 grams of 40% AOS in 7.5 grams of DI water was added to the reaction vessel. After 5 minutes, a solution of 0.3 grams of erythorbic acid in 7.5 grams of DI water was added to the reaction vessel. After 30 minutes, another solution of 0.3 grams of 70% TBHP and 0.14 grams of 40% AOS in 7.5 grams of DI water was added to the reaction vessel. A solution of 0.3 grams of erythorbic acid in 7.5 grams of DI water was added to the reaction vessel after 5 minutes. The reaction vessel was maintained at 60° C. for another 30 minutes. The reaction vessel was cooled to room temperature and filtered through a 100-micron cloth. The pH of the resulting emulsion was adjusted to 3.5-4.5 with 28% ammonium hydroxide. The resulting polymer latex had a solid level of 26.2%, and a particle size of 100 nm.

Example 17 (Illustrative)

Monomer Composition=EA/n-BA/BEM/HEMA/BEM (20.5/27.5/45/7) wt.

An emulsion polymer was prepared as follows. A monomer premix was made by mixing 140 grams of DI water, 5 grams of reactive surfactant E-Sperse RS-1618, 102.5 grams of (EA), 137.5 grams of (n-BA), 175 grams of (HEMA), 46.67 grams of (BEM). Initiator A was made by dissolving 5 grams of Azo VA-086 in 40 grams of DI water. Initiator B was prepared by dissolving 2.5 grams of Azo VA-086 in 100 grams of DI water. A 3-liter reactor was charged with 800 grams of DI water, 5 grams of 40% sodium alpha olefin sulfonate (AOS) and 10 grams of Selvol 203, and then the contents were heated to 87° C. under a nitrogen blanket with agitation. After holding the reactor at 87° C. for one hour initiator A was then added to the reactor. After about 2 to 3 minutes, the monomer premix was metered into the reaction vessel over a period of 120 minutes. About 1 minute after the start of monomer premix metering, Initiator B was metered into the reactor over a period of 150 minutes. The reaction temperature was kept at 87° C. After completion of initiator B feed, the temperature of the reaction vessel was maintained at 87° C. for 60 minutes. The reactor was then cooled to 49° C. A solution of 0.61 grams of 70% TBHP and 0.29 grams of 40% AOS in 15 grams of DI water was added to the reactor. After 5 minutes, a solution of 0.59 grams of erythorbic acid in 15 grams of DI water was added to the reactor. The reactor was maintained at 49° C. After 30 minutes, a solution of 0.69 grams of 70% TBHP and 0.29 grams of 40% AOS in 15 grams of DI water was added to the reactor. After 5 minutes, a solution of 0.59 grams of erythorbic acid in 15 grams of DI water was added to the reactor. The reactor was maintained at 49° C. for about 30 minutes. The contents of the reactor were cooled to room temperature and filtered through 100 micron filter cloth. The pH of the resulting emulsion was adjusted to 4 to 5 with ammonium hydroxide. The polymer was diluted with 340 grams of DI water to attain a solids 25.1%, a viscosity 13 cps, and particle size 82 nm.

Example 18 (Illustrative)

Monomer Composition=n-VP/EA/BA/VAc/HEMA (20/15/20/20/25) wt.

An emulsion polymer was prepared as follows. A monomer premix was made by mixing 70 grams of DI water, 2.5 grams of E-Sperse™ RS-1618, 50 grams of (n-VP), 37.5 grams of (EA), 50 grams of (n-BA), 50 grams of vinyl acetate (VAc), and 62.5 grams of (HEMA). Initiator 1 was made by mixing 1.07 grams of 70% TBHP (Alfa Aesar) in 20 grams of DI water. Reductant 2 was prepared by dissolving 0.83 grams of erythorbic acid in 50 grams of DI water. A 1 liter reactor vessel was charged with 400 grams of DI water, 2.5 grams of 40% AOS and 12.5 grams of Selvol™ 502, and then was heated to 65° C. under a nitrogen blanket and mild agitation. Initiator 1 was added to the reaction vessel. After about 1 minute, the monomer premix was metered into the reaction vessel over a period of 120 minutes; while at the same time Reductant 2 was metered to the reaction vessel for over a period of 150 minutes. After the completion of monomer premix feed, 16.5 grams of DI water was added to flush the residual monomers from the premix vessel into the reaction vessel. After the completion of Reductant 2 feed, the temperature of the reaction vessel was maintained at 65° C. for 60 minutes. The reaction vessel was then cooled to 50° C. A solution of 0.3 grams of 70% TBHP and 7.5 grams of DI water was added to the reaction vessel. After 5 minutes, a solution of 0.29 grams of erythorbic acid in 7.5 grams of DI water was added to the reaction vessel. After 30 minutes, a solution of 0.32 grams of 70% TBHP and 7.5 grams of DI water was added to the reaction vessel. After 5 minutes, a solution of 0.29 grams of erythorbic acid in 7.5 grams of DI water was added to the reaction vessel. The reaction vessel was maintained at 50° C. for about 30 minutes. Then, the reaction vessel was cooled to room temperature (22° C.) and filtered through 100 micron cloth. The resulting polymer latex had a solids level 30.8%, and particle size 100 nm (Nicomp 380 nanoparticle size analyzer).

Example 19 (Illustrative)

Monomer Composition=EA/n-BA/HEMA/n-VP/CSEM (23/20/35/20/2) wt.

An emulsion polymer was prepared as follows. A monomer premix was made by mixing 140 grams of DI water, 5 grams of E-Sperse™ RS-1618, 115 grams of (EA), 100 grams of (n-BA), 175 grams of (HEMA), 12.5 grams (CSEM), and 100 grams of (n-VP). Initiator A was made by dissolving 4 grams Azo VA-086 in 40 grams of DI water. Initiator B was prepared by dissolving 0.75 grams of Azo VA-086 in 100 grams of DI water. A 3-liter reactor was charged with 800 grams of DI water, 5 grams of 40% AOS and 20 grams of Selvol™ 203, and then was heated to 87° C. under a nitrogen blanket with mild agitation. After holding the reactor at 87° C. for one hour Initiator A was then added to the reactor. After about 1 minute, the monomer premix was metered into the reaction vessel for over a period of 120 minutes. About 3 minutes after the start of monomer premix introduction, Initiator B was metered into the reactor over a period of 150 minutes. The reaction temperature was maintained at 87° C. After completion of the Initiator B feed, the temperature of the reaction vessel was maintained at 87° C. for an additional 60 minutes. The reactor was then cooled to 49° C. A solution of 0.61 grams of 70% t-BHP (Alfa Aesar) and 0.29 grams of 40% AOS in 15 grams of DI water was added to the reactor. After 5 minutes, a solution of 0.59 grams of erythorbic acid in 15 grams of DI water was added to the reactor. The reactor was maintained at 49° C. After 30 minutes, a solution of 0.69 grams of 70% t-BHP and 0.29 grams of 40% AOS in 15 grams of DI water was added to the reactor. After 5 minutes, a solution of 0.59 grams of erythorbic acid in 15 grams of DI water was added to the reactor. The reactor was maintained at 49° C. for about 30 minutes. The reactor was then cooled to the room temperature (22° C.) and filtered through 100 micron cloth. The pH of the resulting emulsion was adjusted to 4.5 with 10% ammonium hydroxide in water. The polymer emulsion had a solids content of 30.9%, a Brookfield viscosity of 36 cps, and particle size 113 nm (Nicomp 380 nanoparticle size analyzer).

Examples 20 and 21

The following two Examples (20 and 21) compare the effectiveness of a polymer prepared according to the present technology using a reactive surfactant containing two allyl groups versus a polymer containing no crosslinker in creating yield stress fluids with high optical clarity in surfactant media.

Samples containing 2.5 wt % polymer solids, 14 wt % SLES2 and 3 wt % CAPB in DI water were prepared using each of the polymers in Examples 1 and 4. The yield stress of these samples was determined by oscillatory shear measurements on a controlled stress rheometer (TA instruments AR2000EX rheometer, New Castle, Del.) with cone and plate geometry (60 mm cone with a cone angle of 2 degrees and 56 μm gap) at 25° C. The oscillatory measurements are performed at a frequency of 1 Hz. The elastic and viscous moduli (G' and G" respectively) are obtained as a function of increasing stress amplitude. In cases where the swollen polymer particles created a jammed network, G' is larger than G" at low stress amplitudes but decreases at higher amplitudes crossing G" because of rupture of the network. The stress corresponding to the crossover of G' and G" is noted as the yield stress. The optical clarity of the samples (expressed in terms of the nephelometric turbidity unit (NTU)) was measured using a laboratory turbidimeter (HF Scientific Micro 100 Laboratory Turbidimeter, Fort Myers, Fla.). The results of these measurements are shown in Table 1.

TABLE 1

| Example No. | Polymer No. | Yield Stress (Pa) | Optical Clarity (NTU) |
|---|---|---|---|
| 20 (Illustrative) | 4 | 6.4 | 15.8 |
| 21 (comparative) | 1 | 0 | 6.1 |

The technology provides a sample with improved yield stress and acceptable optical clarity. The sample prepared using the comparative polymer (no crosslinking) has high optical clarity but does not have a yield stress.

Examples 22 to 24

The following Examples (22 to 24) compare the effectiveness of polymers prepared according to the present technology that use either an amphiphilic crosslinking agent containing two allyl groups or a combination of an amphiphilic crosslinking agent containing two allyl groups and a conventional crosslinking agent versus a polymer prepared using a conventional crosslinking agent only in terms of creating yield stress fluids with high optical clarity in surfactant media.

Samples containing 2.5 wt % polymer solids, 14 wt % SLES2 and 3 wt % CAPB in DI water were prepared using each of the polymers in Examples 2, 3 and 5. The yield stress and optical clarity of these samples were measured using the same procedures as described in examples 20 and 21. The results are shown in Table 2.

TABLE 2

| Example No. | Polymer No. | Yields Stress (Pa) | Optical Clarity (NTU) |
|---|---|---|---|
| 22 (Illustrative) | 3 | 8.4 | 32.2 |
| 23 (Illustrative) | 5 | 8.7 | 45.5 |
| 24 (comparative) | 2 | 7 | 55.3 |

The technology provides a desirable combination of yield stress and optical clarity (lower NTU) relative to the comparative example.

Examples 25 to 32

The following Examples (25 to 32) compare the effectiveness of polymers prepared according to the present technology that use an amphiphilic crosslinking agent containing two allyl groups versus polymers prepared using amphiphilic crosslinking agents containing either only one allyl group or amphiphilic agents with no crosslinking groups. Samples containing 2.5% wt % polymer, 14% SELS2 and 3% CAPB in DI water were prepared and the yield stress and optical clarity were determined using the techniques described in examples 20 and 21.

TABLE 3

| Example No. | Polymer No. | Yield Stress (Pa) | Optical Clarity (NTU) |
|---|---|---|---|
| 25 (Illustrative) | 9 | 9.9 | 40.5 |
| 26 (Illustrative) | 10 | 12.8 | 19.2 |
| 27 (Illustrative) | 11 | 11.1 | 11.1 |
| 28 (Illustrative) | 12 | 10.5 | 8.0 |
| 29 (Illustrative) | 13 | 10.7 | 10.5 |
| 30 (comparative) | 6 | 0 | 2.4 |
| 31 (comparative) | 7 | 0 | 2.9 |
| 32 (comparative) | 8 | 0 | 4.8 |

The present technology provides samples that show both yield stress and optical clarity. In contrast, the control samples have optical clarity (low NTU) but do not display a yield stress.

Examples 33 to 35

Additional samples containing 2.5 wt % polymer, 14% SLES2 and 3% CAPB were prepared (Examples 33 to 35) and the yield stress and optical clarity were determined by the methods outlined earlier. The results are shown in Table 4.

TABLE 4

| Example No. | Polymer No. | Yield Stress (Pa) | Optical Clarity (NTU) |
|---|---|---|---|
| 33 (Illustrative) | 14 | 13.0 | 43.1 |
| 34 (Illustrative) | 15 | 13.6 | 16.0 |
| 35 (Illustrative) | 16 | 11.1 | 18.0 |

Once again, the present technology provides samples that have the combined properties of yield stress and good optical clarity.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the disclosed technology can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject technology, it will be apparent to those skilled in this art that various changes and modifications can be made therein without departing from the scope of the subject disclosed technology. In this regard, the scope of the disclosed technology is to be limited only by the following claims.

What is claimed is:

1. A yield stress composition comprising:
   (A) water;
   (B) about 0.1 to about 5 wt. % of at least one nonionic amphiphilic polymer polymerized from a monomer composition:
   (i) from about 20 to about 50 wt. % of hydroxyethyl methacrylate;
   (ii) from about 20 to about 50 wt. % of hydroxyethyl methacrylate;
   (iii) from about 10 to about 30 wt. % ethyl acrylate;
   (iv) from about 10 to about 30 wt. % butyl acrylate;
   (v) from about 1 to about 10 wt. % of at least one associative and/or semi-hydrophobic monomer (wherein all monomer weight percentages are based on the weight of the total monomers);
   (vi) from about 0.01 to about 5 wt. % of at least one amphiphilic crosslinking agent containing at least two allyl groups selected from formulas (III) and (IV):

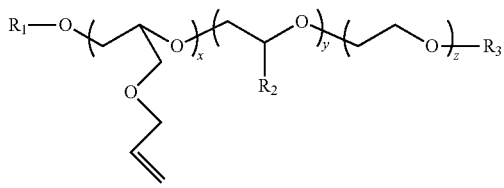

(III)

where:
R1 is a $C_{10-24}$ alkyl, alkaryl, alkenyl, or cycloalkyl;
R2 is $CH_3$, $CH_2CH_3$, $C_6H_5$, or $C_{14}H_{29}$;
R3 is H or $Z^- M^+$
$Z^-$ is $SO_3^-$, or $PO_3^{2-}$;
$M^+$ is $Na^+$, $K^+$, $NH_4^+$, or an alkanolamine;
x is 2-10;
y is 0-200; and
z is 4-200;

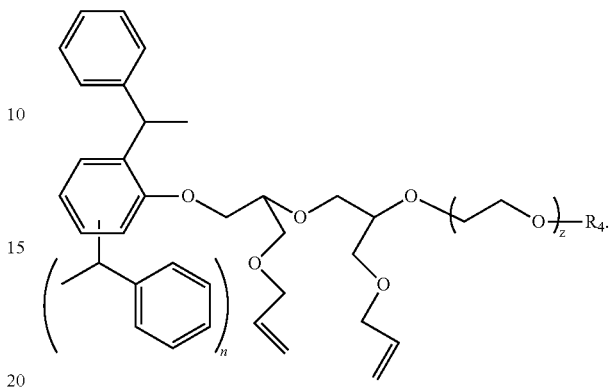

(IV)

where:
n is 1 or 2;
z is 4 to 40; and
$R_4$ is H, $SO_3^-M^+$ or $PO_3^-M^+$, and M is selected from $Na^+$, $K^+$, $NH_4^+$ or an alkanolamine; and
   (C) from about 1 to about 70 wt % based on the total weight of the yield stress fluid of at least one surfactant.

2. A yield stress composition according to claim 1 wherein the concentration of said polymer ranges from about 0.5 to about 3 wt. %.

3. A yield stress composition of claim 1 wherein the at least one surfactant is selected from an anionic, cationic, nonionic, or mixtures thereof.

4. A yield stress composition according to claim 3 wherein the at least one surfactant is selected from an anionic surfactant.

5. A yield stress composition of claim 3 wherein the at least one surfactant is selected from an anionic surfactant and an amphoteric surfactant.

6. A yield stress composition according to claim 5 wherein the at least one anionic surfactant is selected from sodium dodecyl sulfate, sodium lauryl sulfate, sodium laureth sulfate, or mixtures thereof.

7. A yield stress composition according to claim 5 wherein the at least one amphoteric surfactant is cocamidopropyl betaine.

8. A yield stress composition according to claim 5 wherein the ratio of anionic surfactant to amphoteric surfactant (active material) is 10:1 to about 2:1.

9. A yield stress composition according to claim 1 wherein the concentration of surfactant is less than 25 wt. % (active), based on the weight of the yield stress fluid.

10. A yield stress composition according to claim 9 wherein the concentration of surfactant ranges from about 6 to about 20 wt. % (active material), based on the weight of the total composition.

11. A yield stress composition according to claim 1 wherein said yield stress fluid has properties that are substantially independent of pH when in the pH range 2 to 14.

12. A yield stress yield stress composition of claim 1 having a nephelometric turbidity unit (NTU) value of 50 or less.

13. A yield stress composition of claim 1 further comprising an electrolyte.

14. A yield stress composition according to claim 13 wherein said electrolyte is selected from potassium pyrophosphate, potassium tripolyphosphate, sodium or potassium citrate, calcium chloride and calcium bromide, zinc halides, barium chloride calcium nitrate, potassium chloride, sodium chloride, potassium iodide, sodium bromide, and ammonium bromide, alkali metal or ammonium nitrates, and blends thereof.

15. A yield stress composition according to claim 14 wherein the amount of the electrolyte ranges from about 0.1 to about 4 wt. %, based on the weight of the total composition.

16. A yield stress composition according of claim 15 further comprising an insoluble material, a particulate material, or combinations thereof.

17. A yield stress composition according to claim 16 wherein said particulate material is selected from mica, coated mica, pigments, exfoliants, anti-dandruff agents, clay, swellable clay, laponite, microsponges, cosmetic beads, cosmetic microcapsules, flakes, or mixtures thereof.

18. A yield stress composition according to claim 16 wherein said particulate material is selected from sand, sintered bauxite, glass balls, ceramic materials, polystyrene beads, or mixtures thereof.

19. A yield stress composition according to claim 16 wherein said insoluble material is selected from gas bubbles, liposomes, silicones, or mixtures thereof.

20. A drilling fluid for use in drilling subterranean formations comprising a yield stress composition according claim 1.

21. A hydraulic fracturing fluid for use in fracturing subterranean formations comprising a yield stress composition according claim 1.

22. A hydraulic fracturing fluid according to claim 21 further comprising a proppant.

23. A yield stress composition according to claim 1 wherein said semi-hydrophobic monomer is selected from at least one monomer represented by formulas VIII and IX:

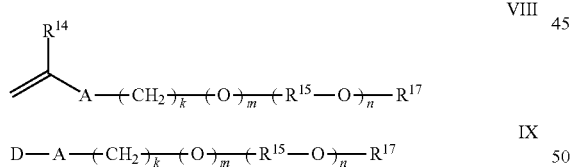

VIII

IX wherein $R^{14}$ is hydrogen or methyl; A is —$CH_2C(O)O$—, —$C(O)O$—, —$O$—, —$CH_2O$—, —$NHC(O)NH$—, —$C(O)NH$—, —$Ar$—$(CE_2)_z$-$NHC(O)O$—, —$Ar$—$(CE_2)_z$-$NHC(O)NH$—, or —$CH_2CH_2NHC(O)$—; Ar is a divalent arylene; E is H or methyl; z is 0 or 1; k is an integer ranging from about 0 to about 30, and m is 0 or 1, with the proviso that when k is 0, m is 0, and when k is in the range of 1 to about 30, m is 1; ($R^{15}$—$O$)$_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150; $R^{17}$ is selected from hydrogen and a linear or branched $C_1$-$C_4$ alkyl group; and D represents a vinyl or an allyl moiety.

24. A yield stress composition according to claim 23 wherein said semi-hydrophobic monomer is selected from at least one monomer represented by formulas VIIIA and VIIIB:

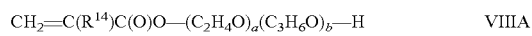

$CH_2$=$C(R^{14})C(O)O$—$(C_2H_4O)_a(C_3H_6O)_b$—H      VIIIA

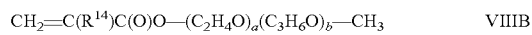

$CH_2$=$C(R^{14})C(O)O$—$(C_2H_4O)_a(C_3H_6O)_b$—$CH_3$      VIIIB wherein $R^{14}$ is hydrogen or methyl, and "a" is an integer ranging from 0 or 2 to about 120, and "b" is an integer ranging from about 0 or 2 to about 120, subject to the proviso that "a" and "b" cannot be 0 at the same time.

25. A yield stress composition according to claim 1 wherein said amphiphilic polymer comprises a conventional crosslinking agent which is present in an amount sufficient to be incorporated into said polymer from about 0.01 to about 1 wt. %, based on the dry weight of the polymer.

26. A yield stress composition according to claim 25 wherein said conventional crosslinking agent contains an average of about 3 crosslinkable unsaturated moieties.

27. A yield stress composition according to claim 25 wherein said monomer mixture comprises a conventional crosslinking agent which is present in an amount sufficient to be incorporated into said polymer from about 0.01 to about 0.3 wt. %, based on the dry weight of the polymer.

28. A yield stress composition according to claim 25 wherein the at least one conventional crosslinking agent is selected from polyallyl ethers of trimethylolpropane, polyallyl ethers of pentaerythritol, polyallyl ethers of sucrose, or mixtures thereof.

29. A yield stress composition according to claim 28 wherein the at least one conventional crosslinking agent is selected from pentaerythritol diallyl ether, pentaerythritol triallyl ether, pentaerythritol tetraallyl ether; or mixtures thereof.

30. A yield stress composition according to claim 1 wherein said polymer is an emulsion polymer.

31. A yield stress composition according to claim 1 wherein polymer is polymerized from a monomer composition comprising:
    a) from about 20 to about 60 wt. % of at least one $C_1$-$C_4$ hydroxyalkyl (meth)acrylate;
    b) from about 10 to about 70 wt. % of at least one $C_1$-$C_{12}$ alkyl (meth)acrylate or from about 10 to about 70 wt. % of at least one $C_1$-$C_5$ alkyl (meth)acrylate;
    c) from about 0 to about 40 wt. % of at least one vinyl ester of a $C_1$-$C_{10}$ carboxylic acid;
    d) from about 0 to about 30 wt. % of a vinyl lactam (e.g., vinyl pyrrolidone);
    e) from about 0 to about 15 wt. % of at least one associative and/or a semi-hydrophobic monomer (wherein all monomer weight percentages are based on the weight of the total monomers); and
    f) from about 0.01 to about 5 wt. % of at least one crosslinker (based on the dry weight of the polymer) selected from an amphiphilic crosslinking agent or a combination of an amphiphilic crosslinking agent and said conventional crosslinking agent.

32. A yield stress composition according to claim 31 wherein said polymer is polymerized from a monomer composition comprising:
    a) from about 20 to about 60 wt. % of at least one $C_1$-$C_4$ hydroxyalkyl (meth)acrylate;
    b) from about 10 to about 30 wt. % ethyl acrylate;
    c) from about 10 to about 35 wt. % butyl acrylate;

d) from about 0 to about 25 wt. % of a vinyl ester of a carboxylic acid selected from vinyl formate, vinyl acetate, vinyl propionate, vinyl butyrate, vinyl isobutyrate, and vinyl valerate;
e) from about 0 to about 30 wt. % of vinyl pyrrolidone;
f) from about 0 to about 15 wt. % of at least one associative monomer and/or semi-hydrophobic monomer (wherein all monomer weight percentages are based on the weight of the total monomers); and
g) from about 0.01 to about 5 wt. % of at least one crosslinker (based on the dry weight of the polymer) selected from an amphiphilic crosslinking agent or a combination of an amphiphilic crosslinking agent and said conventional crosslinking agent.

33. A yield stress composition according to claim 31 wherein said polymer is polymerized from a monomer composition comprising:
a) from about 20 to about 50 wt. % of hydroxyethyl methacrylate;
b) from about 10 to about 30 wt. % ethyl acrylate;
c) from about 10 to about 30 wt. % butyl acrylate;
d) from about 0 to about 25 wt. % of vinyl pyrrolidone;
e) from about 0 to about 25 wt. % of vinyl acetate;
f) from about 0 to about 10 wt. % of at least one associative and/or semi-hydrophobic monomer (wherein all monomer weight percentages are based on the weight of the total monomers); and
g) from about 0.01 to about 5 wt. % of at least one crosslinker (based on the dry weight of the polymer) selected from an amphiphilic crosslinking agent or a combination of an amphiphilic crosslinking agent and said conventional crosslinking agent.

34. A yield stress composition according to claim 31 wherein said polymer is polymerized from a monomer composition comprising:
a) from about 20 to about 50 wt. % of hydroxyethyl methacrylate;
b) from about 10 to about 40 wt. % ethyl acrylate;
c) from about 10 to about 20 wt. % butyl acrylate;
d) from about 0.1 to about 10 wt. % of at least one associative and/or semi-hydrophobic monomer (wherein all monomer weight percentages are based on the weight of the total monomers); and
e) from about 0.01 to about 5 wt. % in one aspect, from about 0.1 to about 3 wt. % of at least one crosslinker (based on the dry weight of the polymer) selected from an amphiphilic crosslinking agent or a combination of an amphiphilic crosslinking agent and said conventional crosslinking agent.

35. A yield stress composition according to claim 31 wherein said polymer is polymerized from a monomer composition comprising:
a) from about 20 to about 50 wt. % of hydroxyethyl methacrylate;
b) from about 10 to about 30 wt. % ethyl acrylate;
c) from about 10 to about 30 wt. % butyl acrylate;
d) from about 1 to about 10 wt. % of at least one associative and/or semi-hydrophobic monomer (wherein all monomer weight percentages are based on the weight of the total monomers); and
e) from about 0.01 to about 5 wt. % of at least one crosslinker (based on the dry weight of the polymer) selected from an amphiphilic crosslinking agent or a combination of an amphiphilic crosslinking agent and said conventional crosslinking agent.

36. A yield stress composition according to claim 31 wherein said polymer is polymerized from a monomer composition comprising:
a) from about 20 to about 35 wt. % of hydroxyethyl methacrylate;
b) from about 10 to about 30 wt. % ethyl acrylate;
c) from about 10 to about 30 wt. % butyl acrylate;
d) from about 15 to about 25 wt. % of vinyl pyrrolidone,
e) from about 15 to about 25 wt. % of vinyl acetate (wherein all monomer weight percentages are based on the weight of the total monomers); and
f) from about 0.01 to about 5 wt. % of at least one crosslinker (based on the dry weight of the polymer) selected from an amphiphilic crosslinking agent or a combination of an amphiphilic crosslinking agent and said conventional crosslinking agent.

37. A yield stress composition according to claim 31 wherein said polymer is polymerized from a monomer composition comprising:
a) from about 20 to about 40 wt. % of hydroxyethyl methacrylate;
b) from about 10 to about 30 wt. % ethyl acrylate;
c) from about 10 to about 30 wt. % butyl acrylate;
d) from about 15 to about 25 wt. % of vinyl pyrrolidone;
e) from about 1 to about 5 wt. % of at least one associative and/or semi-hydrophobic monomer (wherein all monomer weight percentages are based on the weight of the total monomers); and
f) from about 0.01 to about 5 wt. % of at least one crosslinker (based on the dry weight of the polymer) selected from an amphiphilic crosslinking agent or a combination of an amphiphilic crosslinking agent and said conventional crosslinking agent.

38. A yield stress composition according to claim 31 wherein said associative monomer in said monomer composition is selected from lauryl polyethoxylated (meth)acrylate, cetyl polyethoxylated (meth)acrylate, cetearyl polyethoxylated (meth)acrylate, stearyl polyethoxylated (meth)acrylate, arachidyl polyethoxylated (meth)acrylate, behenyl polyethoxylated (meth)acrylate, cerotyl polyethoxylated (meth)acrylate, montanyl polyethoxylated (meth)acrylate, melissyl polyethoxylated (meth)acrylate, where the polyethoxylated portion of the monomer contains about 2 to about 50 ethylene oxide units.

39. A yield stress composition according to claim 1 wherein said associative monomer is represented by formula VIIB:

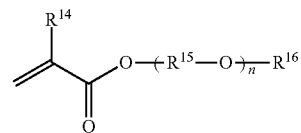

VIIB wherein $R^{14}$ is hydrogen or methyl; $R^{15}$ is a divalent alkylene moiety independently selected from $C_2H_4$, $C_3H_6$, and $C_4H_8$, and n represents an integer ranging from about 10 to about 60, ($R^{15}$—O) can be arranged in a random or a block configuration; $R^{16}$ is a substituted or unsubstituted alkyl selected from a $C_8$-$C_{30}$ linear alkyl, a $C_8$-$C_{30}$ branched alkyl, a $C_8$-$C_{30}$ carbocyclic alkyl, a $C_2$-$C_{30}$ alkyl-substituted phenyl, an araalkyl substituted phenyl, and an aryl-substituted $C_2$-$C_{30}$ alkyl, wherein the $R^{16}$ alkyl group, aryl group, phenyl group optionally comprises one or more substituents selected from the group consisting of a hydroxyl group, an alkoxyl group, benzyl group styryl group, and a halogen group.

\* \* \* \* \*